(12) United States Patent
Brombach

(10) Patent No.: US 12,311,797 B2
(45) Date of Patent: May 27, 2025

(54) METHOD FOR CONTROLLING AN EXCHANGE POWER BETWEEN A CHARGING INFRASTRUCTURE AND AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 786 days.

(21) Appl. No.: 17/537,247

(22) Filed: Nov. 29, 2021

(65) Prior Publication Data

US 2022/0169139 A1 Jun. 2, 2022

(30) Foreign Application Priority Data

Nov. 30, 2020 (EP) .................................... 20210651

(51) Int. Cl.
*H02J 7/00* (2006.01)
*B60L 53/62* (2019.01)
(Continued)

(52) U.S. Cl.
CPC ............... *B60L 53/65* (2019.02); *B60L 53/62* (2019.02); *B60L 53/63* (2019.02); *B60L 53/66* (2019.02); *B60L 53/68* (2019.02)

(58) Field of Classification Search
CPC .......... B60L 53/65; B60L 53/68; B60L 53/62; B60L 53/66; B60L 53/63
(Continued)

(56) References Cited

U.S. PATENT DOCUMENTS

| 2013/0334880 A1 | 12/2013 | Jerphagnon |
| 2016/0178678 A1* | 6/2016 | Pelletier ............. G01R 21/1333 700/291 |

(Continued)

FOREIGN PATENT DOCUMENTS

| CN | 110168831 A | 8/2019 |
| CN | 110800181 A | 2/2020 |

(Continued)

OTHER PUBLICATIONS

Vandael et al., "A Scalable Three-Step Approach for Demand Side Management of Plug-in Hybrid Vehicles," *IEEE Transactions on Smart Grid* 4(2): 720-728, Nov. 29, 2012. (9 pages).

*Primary Examiner* — Alexis B Pacheco
(74) *Attorney, Agent, or Firm* — Seed IP Law Group LLP

(57) ABSTRACT

Provided is a method for controlling an exchange power between a charging infrastructure and an electrical supply network. A plurality of power units for outputting or taking up electrical power are connectable to the charging infrastructure in order to exchange electrical power between the power units and the electrical supply network via the charging infrastructure. The method includes determining an energy predefinition for a control time period, predefining a power limitation, and predefining an exchange power profile depending on the energy predefinition and the power limitation. The method includes determining partial exchange powers for the power units. A sum of the partial exchange powers substantially corresponds to the exchange power, determining the partial exchange powers is effected depending on states of charge of the power units, and determining the partial exchange powers is effected taking account of partial power limits of the power units.

24 Claims, 7 Drawing Sheets

(51) Int. Cl.
*B60L 53/63* (2019.01)
*B60L 53/65* (2019.01)
*B60L 53/66* (2019.01)
*B60L 53/68* (2019.01)
*H02J 7/14* (2006.01)

(58) Field of Classification Search
USPC .......................................................... 320/109
See application file for complete search history.

(56) References Cited

U.S. PATENT DOCUMENTS

| | | | |
|---|---|---|---|
| 2017/0136889 A1* | 5/2017 | Ricci | B60L 53/126 |
| 2018/0201148 A1* | 7/2018 | Donnelly | G05D 1/0088 |
| 2020/0023747 A1* | 1/2020 | Logvinov | B60L 55/00 |
| 2020/0062138 A1* | 2/2020 | Smolenaers | B60L 55/00 |
| 2020/0276910 A1* | 9/2020 | Harty | B60L 55/00 |
| 2020/0290472 A1* | 9/2020 | Heyne | G01R 31/374 |
| 2020/0328595 A1* | 10/2020 | Yasuda | H02J 3/38 |
| 2021/0291671 A1* | 9/2021 | Lu | B60L 53/12 |

FOREIGN PATENT DOCUMENTS

| | | |
|---|---|---|
| DE | 102010030093 A1 | 12/2010 |
| DE | 102015101738 A1 | 8/2016 |
| DE | 102015206510 A1 | 10/2016 |
| EP | 2 751 902 A1 | 7/2014 |
| EP | 3 552 867 A1 | 10/2019 |
| NL | 2008058 C2 | 7/2013 |
| WO | 2017/011373 A1 | 1/2017 |

\* cited by examiner

METHOD FOR CONTROLLING AN EXCHANGE POWER BETWEEN A CHARGING INFRASTRUCTURE AND AN ELECTRICAL SUPPLY NETWORK

BACKGROUND

Technical Field

The present invention relates to a method for controlling an exchange power between a charging infrastructure and an electrical supply network, and the invention relates to a corresponding charging infrastructure. The invention also relates to a charging station for charging electric vehicles which has such a charging infrastructure.

Description of the Related Art

A charging infrastructure is required particularly for charging a vehicle fleet of electric vehicles. The electric vehicles are thus connected to such a charging infrastructure for the purpose of charging their electrical storage devices. The electric vehicles are disconnected from the charging infrastructure in order to perform their driving activity. A typical cycle of such a system comprising charging infrastructure and electric vehicles may be manifested such that electric vehicles, for example a fleet of electric buses, are in use during the day, and then in the evening return for charging, for example to the depot. The charging infrastructure may be installed at the depot with various charging terminals, namely one charging terminal per electric vehicle. However, the charging infrastructure may also be distributed over a plurality of depots, staying with this example. Such a vehicle fleet requires a comparatively large amount of energy in order to be recharged. It may therefore be expedient to procure this energy in a central process. In this case, it is possible in particular to utilize time periods in which there is no bottleneck present or it is possible for peak times of power consumption to be avoided for charging the electric vehicles. As a result, the burden on the electricity grid, that is to say the electrical supply network, can be relieved, but price advantages can be achieved as well.

In peak power times it is even possible for the electrical storage devices of the vehicle fleet to make electrical power or electrical energy available to the electrical supply network via the charging infrastructure. The interaction between the electrical storage devices of the electric vehicle and the electrical supply network and thus the interaction of the charging infrastructure with the electrical supply network therefore do not just concern taking up electrical power from the electrical supply network, but rather may also concern feeding electrical power into the electrical supply network.

What is problematic about such a concept, however, is implementing it in concrete terms. The electric vehicles return for charging at different times and these different times may regularly also be indeterminate. Although often a timetable or service schedule may be available, deviations should often be expected on account of traffic situations. The same also applies to the supply situation in the electrical supply network, which is variable for other reasons. In other words, a variable and in part unknown demand by the electric vehicles including variability and uncertainty of their availability is to be coordinated with a variable and in part unknown supply situation or even demand situation of the electrical supply network.

In the European priority application, the European Patent Office searched the following prior art: EP 3 552 867 A1, EP 2 751 902 A1, WO 2017/011373 A1.

BRIEF SUMMARY

One or more embodiments are directed to controlling the charging of electric vehicles taking account of a supply situation in the electrical supply network.

Accordingly, a method for controlling an exchange power between a charging infrastructure and an electrical supply network is proposed. In this respect, the charging infrastructure is an infrastructure via which a plurality of electric vehicles are connected to the electrical supply network. In this case, a plurality of power units are provided which, for outputting or taking up electrical power, are connected to the charging infrastructure. It is thereby possible to exchange electrical power between the power units and the electrical supply network via the charging infrastructure.

A plurality of the power units are in each case embodied as electric vehicles, such that electric vehicles are in each case connectable to the charging infrastructure in order to exchange electrical power between the electric vehicles and the electrical supply network via the charging infrastructure and thereby to charge or discharge electric vehicles.

The electric vehicles are essentially discharged by their driving activity. However, once they have come to the charging infrastructure for charging, they may also still have a residual charge or, after a partial charging process, have a charge which can be used temporarily for backing up the electrical supply network or else for charging some other neighboring storage device (charging transfer). Particularly in such a case, the electric vehicle is then at least partly discharged via the charging infrastructure. The ultimate aim, however, is for the electric vehicle or its electrical storage device to be charged in order then to be ready for driving again.

The method based on this structure or the method controlling this structure thus comprises at least the steps provided herein. Accordingly, an energy predefinition for a control time period is determined, which predefines at least the quantity of energy which the charging infrastructure is intended to draw from the electrical supply network in the control time period. Said quantity of energy can be ascertained in particular as an energy demand of the charging infrastructure for charging the electric vehicles. It may be referred to as a charging energy demand.

Therefore, at least the quantity of energy together with the control time period is predefined. However, the energy predefinition can also predefine a temporal energy range, which, specifically by way of a temporal upper limit and a temporal lower limit, specifies a range for the control time period, and defines how much energy is permitted to be drawn as a maximum and is intended to be drawn as a minimum and when. It has been recognized here that the control time period, which may concern a whole night, is usually long enough that the energy for charging the electric vehicles need not be provided immediately, but rather can adapt to times expedient for the electrical supply network. For this purpose, however, this information has to be known and that is thus provided by the energy predefinition.

For drawing the energy, power has to be transmitted and it has been recognized that this may be subject to limits. These limits may be variable, however, and should already be taken into account beforehand during planning. Therefore, predefining a power limitation is proposed, which specifies at least one limit for the exchange power which can be provided by the charging infrastructure. In particular, an upper limit and a lower limit can be predefined, which can also vary temporally. In that case they can each be predefined as a temporal profile of the upper limit and of the lower limit.

It is taken into account in particular that the power of electrical connection nodes or connection locations may be limited. The electrical storage devices, too, cannot be charged with arbitrarily high power. All this can be taken into account by the predefined power limitation.

There are thus many possibilities for concretely configuring the charging of the electric vehicle, namely in respect of how much power is exchanged between the electric vehicle and the electrical supply network and when. The energy predefinition and the power limitation predefine a framework for this, which framework can already be taken into account during planning.

However, the method does not concern the charging of a single vehicle, but rather the charging of a plurality of electric vehicles. Such a framework can be predefined for each electric vehicle, wherein the method proposes predefining such a framework, namely the energy predefinition and the power limitation, as a total predefinition for all connected electric vehicles and thus predefining it for the charging infrastructure.

On the basis of this, an exchange power profile is then predefined, namely depending on the energy predefinition and the power limitation. The exchange power profile predefines for the charging infrastructure a temporal profile of the exchange power. The exchange power profile thus predefines for the control time period how much power the charging infrastructure draws from the electrical supply network, or feeds into the latter, and when.

This predefinition of the exchange power profile is effected such that the exchange power profile lies in the predefined control time period and the energy predefinition and the power limitation are complied with. This enables in particular an external unit to predefine the exchange power profile. What is taken into consideration here, in particular, is that a control unit of the charging infrastructure determines the energy predefinition and predefines the power limitation and transfers same to a network operator or an electricity marketer in the network and the latter predefines the exchange power profile, namely in the framework of the energy predefinition and the power limitation which it has to take into account here.

If the exchange power profile is integrated over time, namely in particular over the control time period, this results in a quantity of energy which is retrieved from the electrical supply network for charging the electric vehicles. Such a quantity of energy, which may also be referred to as a charging energy demand or synonymously as a quantity of charging energy or simply charging energy, is taken into account in the energy predefinition.

Partial exchange powers for the power units which are to be provided in each case by the power unit are then determined, wherein the sum of the partial exchange powers substantially corresponds to the exchange power. In particular, the sum of the partial exchange powers corresponds to the exchange power if losses can be disregarded.

Determining the partial exchange powers is effected depending on states of charge of the power units and taking account of partial power limits of the power units. It has been recognized here, in particular, that it is not sufficient for the exchange power simply to be divided only proportionally to the storage capacity, rather that it is expedient to take account of power limitations of the individual power units.

It has additionally been recognized that a consideration of power limits of the charging infrastructure overall may be too little or too inaccurate, or that such power limits may vary, namely depending on the individual power units.

Finally, providing the partial exchange powers by means of the power units is effected in order thereby to provide the exchange power between the charging infrastructure and the electrical supply network.

In the simplest case, therefore, each power unit outputs or takes up exactly as much partial exchange power as is provided by the predefinition of the respective partial exchange power. However, consideration is given to still changing the provision of such a partial exchange power during the time period of the provision if it is found for example that on account of losses, in particular, a power unit does not charge as rapidly as was assumed in the predefinitions.

The method thus predefines the framework for the exchange power by way of the energy predefinition and the power limitation. A concrete power profile, namely the exchange power profile, is defined in this framework. This profile is then split specifically between the individual electric vehicles, namely by partial exchange powers being ascertained on the basis of the exchange power profile. It is thereby possible to control the exchange power between the infrastructure and the electrical supply network.

It is thus a special feature here that the individual electric vehicles do not independently draw power, rather that that is coordinated and that it is also planned in advance. The exchange power profile, in particular, may therefore also be referred to as a planned exchange power profile.

In accordance with one aspect, it is provided that the partial power limits are variable and are determined depending on states of charge of the respective power units. It has been recognized, in particular, that the partial power limits are dependent on the states of charge of the respective power units and the division of the exchange power between the power units can take that into account well and can thus improve the power division.

Additionally or alternatively, it is proposed to predefine the partial exchange powers as partial power profiles $P_i(t)$ depending on the exchange power profile.

Partial power profiles are thus determined depending on the exchange power profile. Said partial power profiles each predefine for one of the power units a temporal profile of an exchange power in the control time period. The sum of all the partial power profiles then forms the exchange power profile, at any rate theoretically if power losses are disregarded.

One possibility for calculating the partial power profiles consists, for example, in the values of the exchange power profile being divided by the number of power units, taking account of the partial power limits. If partial power limits are reached here, an excess power which at least could not be distributed to one of the power units on account of at least one partial power limit may arise in a first step. Said excess power can then be divided between the remaining power units that have not reached a partial power limit.

However, if the power units are of different sizes or have different states of charge, or both, then these variables can correspondingly be concomitantly included in calculation. By way of example, for each power unit at the beginning of the control time period its energy demand for complete charging could be ascertained and compared. By way of example, the sum of all these energy demands could be formed and each power unit then acquires a respective power proportion of the total exchange power which corresponds to the proportion constituted by the energy demand of said power unit in relation to the sum of all the energy demands, to mention a further example. If an excess power arises because at least one partial power limit was reached, for the excess power this division can be repeated for the remaining power units.

It is thus proposed that determining the energy predefinition and/or predefining the exchange power profile P(t) are/is effected depending on states of charge of the power units. In this case, a total state of charge is determinable from the states of charge of the power units insofar as they are connected to the charging infrastructure. This aspect takes this as a starting point and proposes that for the total state of charge a temporal profile of a state of charge range is predefined as flexibility range.

The flexibility range is spanned by a temporal profile of an upper limit of the total state of charge and a temporal profile of a lower limit of the total state of charge for the control time period. For the totality of all connected power units, said flexibility range thus specifies a state of charge range. The temporal profile can accordingly be manifested such that the upper limit and the lower limit start at a common point, which thus specifically corresponds to the total state of charge present at that moment. From this point the lower limit can fall over time to a minimum value, which can correspond to the situation when all the power units have been discharged or have been discharged to an extent such as is technically still tenable without damage. With increasing time, said lower limit then rises again since the power units or their electrical storage devices should be substantially charged at the end of the time period.

By contrast, the upper limit can rise from the outset, namely in an idealized way to the value corresponding to a full charge of all affected electrical storage devices. However, there is also consideration of the fact that both limits do not start from the same point, specifically if they are determined at an instant at which it is not yet known how the actual total state of charge will be manifested. Uncertainties arise for the total state of charge particularly owing to the fact that it is only possible to estimate the partial state of charge which can be manifested in returning to the charging infrastructure. However, there is also consideration of the fact that, for example, an electric vehicle returns too late and therefore cannot yet be taken into account at the beginning of the flexibility range.

These lower and upper limits which span this flexibility space have, particularly at the beginning and at the end, gradients which take account of the fact that the affected electrical storage devices cannot be discharged or charged arbitrarily rapidly.

The flexibility range thus reflects the overall available charging capacity and in this case takes account of initial states of charge or initial states of charge to be expected and also the required dynamics of charging and discharging. The flexibility range thus represents in a simple manner an overall picture that includes all this information and in this case combines it for this overall picture for the entire charging infrastructure.

Determining the energy predefinition and/or predefining the exchange power profile (P(t)) are/is then effected depending on these flexibility ranges. It has been recognized here in particular that the flexibility range is internal information of the charging infrastructure. A network operator or network marketer, in particular, is not familiar with the internal boundary conditions of the infrastructure. In this regard, it is not possible to gauge in particular from the flexibility range how greatly or rapidly this charge can be changed. It is therefore proposed to derive the process of determining the energy predefinition and/or the process of predefining the exchange power profile (P(t)) from said flexibility range. Such boundary conditions can be taken into account in this case. In particular, the speed at which the individual electrical storage devices can be charged or discharged, and thus the speed at which the total state of charge can be changed, corresponds to a power value. As a result, the exchange range also correspondingly has upper and lower limits that reflect said boundary conditions.

However, there is also consideration of the fact that the flexibility range itself is provided for taking into account, or equivalent information, such as an energy range which corresponds to the flexibility range but has corresponding energy values instead of states of charge. In this case, the flexibility range or the equivalent information can be provided externally, i.e., to an external unit such as a network operator.

In particular, it is proposed here that the control time period ends at an instant and the upper limit of the total state of charge at this target instant is greater than the lower limit of the total state of charge. In accordance with this aspect, the flexibility range thus has at the target instant, that is to say at its temporal end, a corridor in which the total state of charge is permitted to fluctuate. It has been recognized here in particular that it may often suffice for the electrical storage devices of the electric vehicles to have for example only 90% charge, instead of 100% charge, at the beginning of their travel. This can be passed on as a variation range. This opens up the possibility of also making the planning of the envisaged power exchange somewhat more flexible, or allowing a deviation from the target state of charge without adjusting the power exchange if boundary conditions would lead to a deviation.

In accordance with one aspect, it is proposed that determining the partial exchange powers is effected in each case depending on a deviation of the state of charge of the respective power unit from a relative average state of charge, wherein the determining is effected such that the respective state of charge is matched to the average state of charge. What is thus proposed is that not all the storage devices of the power units are charged equally rapidly having regard to their storage capacity, rather that an attempt is made to match the relative states of charge. Relative states of charge may be specified in percent, in particular. Thus, if, e.g., one storage device has a state of charge of 30%, it is charged more rapidly than one with 80%. The storage device with 30% can, e.g., be charged first, or to a greater extent.

A number of effects have been recognized here. One effect is that partial power limits cannot be reached as easily and can thus be utilized better. On the basis of the previous example, charging both storage devices to the same extent, which storage devices initially had a state of charge of 30% and 80%, respectively, could result in a state of charge of 50% and 100%. The storage device with 100% can then no longer take up power, that is to say is at a power limit. That thus results in a great power limitation also for the charging infrastructure overall.

However, if one storage device were charged to a greater extent, a state of 65% and 85% could be established at the same instant. The total state of charge is the same, but the power limits have not yet been reached and the power limit of the charging infrastructure is thus higher overall if additional power is required.

For planning ahead, what can additionally also be achieved by means of the matching is that the overall effective power limit for the charging infrastructure varies to a lesser extent and an overall effective power limit can be predicted better with respect to a total state of charge, without the states of charge of the power units having to be known, since the method prevents power units from encountering a power limit too early and singularly.

In accordance with one aspect, it is proposed that:
a positive partial exchange power with which the power unit is charged is determined depending on a difference between the state of charge and a state of charge to be reached, in particular fully charged state of charge, and
a negative partial exchange power with which the power unit is discharged is determined depending on a difference between the state of charge and a discharged state of charge.

If the storage devices take up electrical power, the distribution of the exchange power between the power units is thus controlled such that the quantity of energy still to be charged is taken into consideration. That is taken into consideration for all the storage devices and the exchange power is ideally divided in equal ratios for this purpose. The respective quantity of energy can also be determined here such that in each case the percentage state of charge of the storage devices, i.e., power units, is taken into consideration and the capacity of the storage device is additionally taken into consideration.

The exchange power is ideally divided proportionally to the quantity of energy still to be charged. The storage devices which thus are still, from a relative standpoint, the furthest away from the fully charged state are consequently charged to the greatest extent. Matching is thus achieved as well.

In the case of a negative partial exchange power, that is to say if energy is intended to be discharged and fed into the electrical supply network, the state of charge is taken into consideration, however. Specifically, the margin separating the state of charge from a discharged state is thus taken into consideration. Here as well, in regard thereto a uniform or proportional division of the exchange power can be effected, namely proportionally to the state of charge. Matching is thus achieved for a negative exchange power.

In both cases, if here limits are reached and thus an excess power occurs, that can be distributed according to the same pattern between the power units which have not encountered a power limit.

Additionally or alternatively it is proposed that:
when predefining a positive exchange power which involves power being drawn from the electrical supply network for the purpose of charging the power units, power units which have a state of charge below a or the relative average state of charge are charged with priority and/or to a greater extent than power units which have a state of charge above the relative average state of charge, and
when predefining a negative exchange power which involves power being fed into the electrical supply network for the purpose of discharging the power units, power units which have a state of charge above the relative average state of charge are discharged with priority and/or to a greater extent than power units which have a state of charge below the relative average state of charge.

A relative average state of charge is, in particular, a percentage average state of charge. It can be the absolute total state of charge in relation to the total storage capacity. In particular, the percentage total state of charge can form the relative average state of charge. Power units which have a state of charge above or below the relative average state of charge are thus those whose percentage state of charge lies above or below the percentage value of the total state of charge.

Depending thereon, the power units are then charged or discharged with priority or to a greater extent. Charging or discharging power units with priority can mean that they are charged or discharged first, in particular until they have reached the relative average state of charge. In this case, a prioritization can also be provided which involves those power units which are furthest away from the relative average state of charge being charged first. However, consideration is also given to only charging them to different extents, that is to say that all the power units are charged despite the differences. In particular, it is proposed that the partial exchange powers are determined in each case proportionally to a difference between states of charge and the relative average state of charge, multiplied by the respective storage capacity of the power unit.

It is thereby possible, in a targeted manner, to take account of which power unit should be charged or discharged to a greater or weaker extent, since the relative average state of charge is a good measure for this.

In accordance with one aspect, it is proposed that:
depending on the exchange power profile
stored energy is transferred from power units having a state of charge above the relative average state of charge into power units having a state of charge below the relative average state of charge.

It has been recognized here, in particular, that the exchange power profile can indicate a high exchange power which can only be realized if all the power units, that is to say all the storage devices, are available for this purpose and do not encounter a partial power limit. In such a case, it is proposed that at least some power units which are charged to very different extents, e.g., 30% and 70%, are matched to one another by charging transfer, here, e.g., each to 50% if they are of the same size. That is taken into consideration in particular in a time segment in which no exchange power is exchanged with the electrical supply network. This is because matching cannot then be achieved by different charging or discharging. However, charging transfer can be provided in addition to matching even when there is a low exchange power.

In accordance with one aspect, it is proposed that a power demand of the electrical supply network is ascertained as a network power demand for the control time period. The network power demand can be ascertained in particular as a temporal profile of the power demand and may be referred to as a network power demand profile.

It is thus proposed that a power demand of the electrical supply network, for example in the case of supply peaks that regularly occur and are basically known in this respect, and also an energy demand of the electric vehicles are taken into account. Determining the exchange power profile is then effected depending on the network power demand and depending on the charging energy demand.

If the control time period in each case concerns a night, for example, then there may be a high power demand at the beginning of this night for example between 18:00 and 20:00, but said demand is very low in the night for example between 0:00 and 4:00. The exchange power profile can then be provided such that, staying with this example, in the evening between 18:00 and 20:00 little power is drawn from the electrical supply network, optionally power is even fed in, in order thereby to support the electrical supply network in this peak electricity range.

In the range from 0:00 and 4:00 mentioned by way of example, by contrast, there is a low demand in the electrical supply network and this range is therefore very suitable for drawing powers from the electrical supply network for charging the electric vehicles. The exchange power profile is accordingly provided, and specifically has low or negative power at the beginning of the control time period during the times between 18:00 and 20:00 mentioned here by way of example, and high values in the range between 0:00 and 4:00 mentioned by way of example. In this case, however, the exchange power profile is defined such that at the end of the control time period the energy predefinition is fulfilled and the power limitation was complied with.

In accordance with one aspect, it is proposed that the charging infrastructure is connected to the electrical supply network at at least one network connection point, the exchange power between the charging infrastructure and the electrical supply network is effected via said at least one network connection point and determining the exchange power profile and/or the partial power profiles is effected depending on at least one property of the at least one network connection point.

It has been recognized here that the charging of a plurality of electric vehicles by a charging infrastructure, in particular the charging of a fleet of electric vehicles, can also have the effect that a loading limit, in particular a correspondingly predefined limit, of a network connection point is reached. The predefining of the exchange power profile can accordingly take this into account.

If the charging infrastructure is distributed such that it uses a plurality of network connection points, that regularly means that at least one electric vehicle is supplied via one network connection point and at least one other electric vehicle is supplied via the further network connection point. In the situation, therefore, the exchange power profile can be limited to such a sufficient extent that they do not exceed a sum of the maximum powers of the network connection points, but without thereby ensuring a limitation of each individual network connection point is also complied with. Correspondingly dividing the partial power profiles can ensure that the maximum powers for each individual network connection point are also complied with.

There is also consideration of the fact that the charging infrastructure has a battery buffer storage device that can temporarily store energy during the charging or discharging of the electric vehicles. In that case, there is consideration of the fact that the sum of the partial power profiles in a time segment exceeds a power limit of the network connection point, yet the power transmitted via the network connection point is not exceeded because part of the power is drawn from the battery buffer storage device.

By way of example, one electric vehicle can be temporarily supplied, in particular charged, by the battery buffer storage device, while the remaining electric vehicles are charged via the network connection point. Accordingly, the partial power profiles of the electric vehicles which are charged via the network connection point are to be correspondingly limited, whereas the electric vehicle supplied from the battery buffer storage device as mentioned by way of example need not be taken into account in the limitation.

In accordance with one aspect, it is proposed that when providing the partial exchange powers, the total state of charge is monitored continuously by means of a central control device and is compared with the predefined state of charge profile. Depending on the comparison, items of information and/or control commands are transmitted from the central control device to the power units in order to readjust the process of providing the partial exchange powers. It is proposed here that providing the partial exchange powers is controlled centrally and is also readjusted centrally. It is readjusted particularly if the total state of charge deviates from the predefined state of charge profile or charging target. The partial exchange powers are then adapted. In this case, the partial exchange powers respectively concern the individual charging process of the power units, i.e., in particular the charging process of the respective electric vehicles. In this case, a corresponding power unit is provided for each electric vehicle and carries out the concrete charging of the respective electric vehicle or of the electrical storage device. Said power unit can in principle also be part of the electric vehicle, but is preferably part of the charging infrastructure.

It is proposed in any case to readjust the partial exchange powers, if appropriate, and that means correspondingly driving these individual charging controllers in order to amplify or to reduce the respective charging process. The total state of charge monitored in this case forms the reference variable.

It has been recognized that there is also consideration of the fact that the individual power units, i.e., in particular the individual electric vehicles or electrical storage devices, behave differently, in particular that they behave differently than originally assumed. In this regard, there is consideration of the fact that the states of charge of the respective power units develop differently. It is thus optionally proposed that the states of charge of the power units are monitored and are compared with predefined states of charge in order thereby to detect partial deviations of the states of charge of the power units.

The predefined states of charge can be predefined in particular in accordance with predefined state of charge profiles. A state of charge profile can thus be predefined for each power unit. A partial deviation of the states of charge is thus in each case the deviation of a state of charge of a power unit from a predefined state of charge of the same power unit. It is proposed for this purpose that providing the partial exchange powers is additionally readjusted depending on said partial deviation. Consequently, the intention is always to consider the total state of charge and also to readjust the total exchange power. However, the additional consideration of the individual deviations of the states of charge of the power units can be taken into account. It can be taken into account by the division of the exchange power between the partial exchange powers being correspondingly adapted during readjustment.

In other words, if for example the exchange power is to be increased by 10%, then firstly all the partial exchange powers can be increased by 10%. When taking account of different partial distributions that arise, this equal distribution can then be adapted, if appropriate, by for example one partial exchange power being increased to a greater extent and another to a lesser extent if this corresponds to the different partial deviations. Staying with the example, it is then possible to increase one partial exchange power by 9% and another by 11%.

Moreover, it is alternatively proposed that determining future partial power profiles is carried out depending on said partial deviations. In particular, it is proposed that a distribution specification for determining the power profiles is adapted depending on said partial deviations. Determining the partial power profiles is effected, in principle, depending on the exchange power profile. Specifically, that is distributed or divided between the partial power profiles, namely in particular according to a predefinable key; in the simplest case, an equal distribution is effected. In the course of carrying out the method, it may emerge that for example the storage devices of the power units have aged to different extents or have different characteristics and/or characteristics that have changed over time for other reasons. That can be derived from said partial deviations since, where larger partial deviations occur, in particular in the relative sense, a correspondingly greater change in the storage power unit has taken place.

In particular, this taking into account can be effected such that the distribution specification with which the exchange power profile is divided between the individual partial power profiles is adapted. In this respect, this method is carried out adaptively, such that an improvement can be achieved for the next determination of the partial power profiles. It should also be taken into account here that the method describes a constantly recurring process. The method thus describes a cycle, which can be explained well on the basis of the example when the electric vehicles perform a driving task during the day and are charged at night. Specifically, in that case a recurring process is present in that an exchange power profile is predefined in each case for the night, during which the electric vehicles are charged, which profile is then traversed during the night and, at the end of the night, it is possible to assess with respect to said profile whether the predefinitions were good or can be adapted.

In accordance with one embodiment it is proposed that a calculation of the total state of charge or a calculation of the charging energy demand of the charging structure is repeated at least when at least one of the electric vehicles is connected to the charging infrastructure or is disconnected therefrom. That is based on the insight that in particular late return of an electric vehicle has the effect that the total state of charge or the charging energy demand can change significantly, and it is therefore proposed to take account of such a late return of an electric vehicle and then to repeat and thereby adapt the corresponding calculations. In principle, there is also consideration here of the fact that an electric vehicle is disconnected from the charging infrastructure at an early stage, for example because a sudden special task has to be performed.

In accordance with one embodiment, it is proposed that when providing the exchange power, the exchange power is detected and compared with a sum of the provided partial exchange powers in order to ascertain a deviation. Depending on the ascertained deviation, providing the partial exchange powers is readjusted in order to reduce the deviation. This proposal of readjustment concerns in particular the insight that losses occur when the exchange power is provided, as a result of which deviations can arise. For compensation purposes, it is thus possible to provide a closed-loop control that readjusts the exchange partial powers. Deviations of the total power are thus used for readjusting the partial powers. Provision is thus made of a controller that splits a total deviation between the individual partial powers for the purpose of readjustment.

In particular, it is proposed that the ascertained deviation is taken into account as deviation energy ascertained over a checking time period. The checking time period is to be provided in particular as a time period from the beginning of the control time period up to the present instant. It is thus possible to determine the deviation energy up to the present instant. Providing the partial exchange powers depending on the ascertained deviation is thus readjusted depending on the ascertained deviation energy. As a result, the readjustment can be improved, both in terms of accuracy and with regard to disturbances, since the deviation energy is the integral of the difference between the envisaged and actual powers. A behavior of a controller having an integral (I) component can thus be achieved.

In accordance with one aspect, it is proposed that a predefined temporal profile of the total state of charge is determined as a state of charge profile from the exchange power profile, and that a deviation of a detected total state of charge from the predefined total state of charge is taken into account as detected deviation energy. The partial power profiles are then readjusted depending on the detected deviation energy. Preferably, readjusting is effected only if the detected deviation energy reaches a predefinable minimum deviation in terms of absolute value.

Consequently, the underlying insight here, too, is that a permanent deviation of the detected profile from the predefined or expected profile can best be recognized by way of a deviation energy. Small short-term deviations, which could also be attributed to measurement inaccuracy or to temporal deviations, possibly need not be readjusted. There is a readjustment demand only if a deviation of the energy also arises, that is to say if overall the storage devices of the electric vehicles are not charged as desired. In order to preclude unnecessary readjustment, the predefinable minimum deviation mentioned can additionally be provided. A relevance threshold is introduced as a result.

There is also the underlying concept here that slight deviations of the total state of charge at the end of the control time period are acceptable. Such deviations can then be taken into account better by way of an adaptation that takes effect only in a later cycle, that is to say if an exchange power profile is predefined once again. That also has the advantage that no ad hoc power changes occur unnecessarily, which specifically cannot be indicated vis-à-vis the electrical supply network and may therefore have a disadvantageous effect on the network backup and/or on procurement costs.

In accordance with one aspect, it is proposed that for a first and at least one second power unit, here as well these being in particular electric vehicles, in each case a partial state of charge profile is predefined. The latter can be calculated in particular from the respective partial power profile. For this purpose, it is proposed to detect a partial deviation between a detected partial state of charge and a partial state of charge predefined by the partial state of charge profile. This deviation is thus referred to as a partial deviation. Such a partial deviation can be determined for each power unit.

For this purpose, it is then furthermore proposed that for the first power unit, depending on its partial deviation, its partial exchange power and/or its predefined partial power profile are/is changed. This is done such that the partial deviation is reduced in terms of absolute value. An attempt is thus made to correct said partial deviation. The change in the partial exchange power results in a change in the exchange power profile or in the total state of charge. The change in this partial exchange power of one power unit thus necessarily affects the total power or the total charge, i.e., all electric vehicles, i.e., the entire charging infrastructure.

For this purpose, it is then proposed that for the at least one further power unit, its partial exchange power and/or its predefined partial power profile are/is changed taking account of its partial deviation. That is intended to be done so as to counteract the change in the exchange power profile and/or the total state of charge by the first power unit. Thus, if the partial exchange power of the first power unit is increased, the total exchange power profile also increases.

That is undesired in principle, however, since that affects the electrical supply network, which, however, ought to be able to rely as far as possible on the predefined exchange power profile.

Accordingly, it is proposed for countermeasures to be taken by one further power unit, or a plurality of further power units in the charging infrastructure. Thus, staying with the example, this at least one further power unit can reduce its partial exchange power. If it reduces its partial exchange power by the same absolute value by which the partial exchange power of the first power unit would be increased, complete compensation is accomplished. However, the further power unit itself usually likewise endeavors to be charged. Therefore, such compensating or counteracting by such an at least one further power unit can be performed only within certain limits.

Preferably, it is thus proposed that the changes of the first and at least one further power unit are carried out such that their partial deviations do not exceed a predefinable maximum deviation in terms of absolute value in each case. This prevents in particular the further power unit from effecting counteracting to an excessively great extent and as a result then no longer being able to be charged sufficiently.

In particular, it is provided that if at least one partial deviation exceeds the predefinable maximum deviation in terms of absolute value, the predefined exchange power profile and/or the predefined state of charge profile are/is changed. In other words, if the deviations are too great, the predefined power exchange profile is indeed adapted as a second measure. That then also has effects on the predefined state of charge profile that was calculated depending on this exchange power profile. It should be taken into account here that the predefined state of charge profile forms in particular a reference variable or setpoint variable.

It has been recognized here in particular that it is advantageous thereby to monitor the profile of each state of charge, that is to say also of the individual states of charge, and thereby to lead as well as possible to a target state of charge, which can also be abbreviated to target SoC. It is thereby possible to react in a timely manner to deviations that become apparent as a result of deviations relative to the respective state of charge profile, that is to say also individual state of charge profile. As a result, the charging process and thus the control of the exchange power can also be conducted well overall.

In accordance with one aspect, it is proposed that at least one controllable consumer and/or one controllable generator of the charging infrastructure are/is controlled such that changing the partial power profiles is compensated for such that the exchange power complies with the predefined exchange power profile. This is based on the insight, in particular, that controllable consumers or generators can be provided in the charging infrastructure. In particular, the charging infrastructure can be part of a depot, which by its nature also has consumers. By way of example, a cold storage warehouse may be a controllable consumer. A cold storage warehouse usually has such a high thermal capacity that the operation of refrigeration units (e.g., cooling devices or refrigerators) can be delayed or brought forward even by 1-2 hours. Further examples may be heating equipment. It should be taken into consideration here that the drawing of electrical power from the electrical supply network may be a desired process that should not be reduced. However, that also depends on the situation.

A controllable generator may be for example a solar installation on the roof of the depot, to stay with the example. It is true that a photovoltaic installation is as far as possible not controlled, but rather should generate as much power as results from the present insolation, which is usually zero at night; however, an electrical storage device can be coupled to the solar installation and can thus output the solar power in a controlled manner. That, too, is just one example of a controlled generator. Depending on the size and location of the depot, also still staying with this example, said depot may also have a wind power installation. In rural areas, moreover, a biogas installation is also taken into consideration.

Through the use of these controlled consumers or generators, a deviation from the predefined exchange power profile can thus be compensated for, such that the actual exchange power profile can remain constant and deviations in the charging infrastructure can be compensated for by these consumers or generators. In other words, if the power required for charging the electric vehicles is more than was previously calculated, i.e., predefined by the exchange power profile, this additionally required power can be provided by the controllable generator. It can also be provided indirectly by the controllable consumer, specifically if the latter was concomitantly taken into consideration when predefining the exchange power profile. The controllable consumer can then supply additional power by virtue of the fact that it itself consumes less power.

In accordance with one aspect, it is proposed that depending on the predefined exchange power profile, a target state of charge is ascertained as a total state of charge expected at the end of the control time period. For this purpose, it is proposed that upon or after reaching the end of the control time period, an end state of charge is detected as an actual total state of charge at the end of the control time period. Furthermore, it is proposed that depending on a result comparison as a comparison of the end state of charge with the target state of charge, the charging energy demand is ascertained for a further control time period. It is thus proposed to detect deviations between assumed state of charge and attained state of charge and to take them into account for a next cycle and thus to carry out an adaptation.

This is based on the insight, in particular, that small deviations in the region of 10% of the total state of charge at the end of the control time period are acceptable. It is thus possible in terms of this order of magnitude to dispense with readjusting the exchange power from the predefined exchange power profile. In the next calculation, that is to say usually for the next day, the deviations can then be taken into account in an improvement. An exchange power profile is then predefined once again, which is then possibly attained better.

In particular, it is provided that the charging energy demand is ascertained by means of a calculation specification and that the calculation specification or the charging energy demand ascertained by means of the calculation specification is changed depending on the result comparison. The calculation specification can be manifested for example such that it forms a difference, between the expected total state of charge at the beginning of the control time period and a desired total state of charge at the end of the control time period. This difference between initial and end states of charge can then already be the charging energy demand.

This difference formation would then be the calculation specification, which however also includes as uncertainty the calculation of an expected value for the total state of charge at the beginning of the control time period. Moreover, the desired total state of charge at the end of the control time period is equatable with the total state of charge expected at the end of the control time period. Specifically, the latter may be expected because the exchange power profile is predefined such that the desired total state of charge is intended to emerge as much as possible. However, the calculation specification can for example also include, in addition to the difference formation mentioned, the taking into account of a power loss to be expected.

This calculation specification can then be adapted depending on the result comparison. In particular, the power loss taken into account here can be changed in this adaptation. By way of example, in the result comparison it may emerge that a lower total state of charge than was expected was reached. Accordingly, an excessively low value was possibly fixed for the power loss. Consequently, in the next step, this power loss can accordingly be increased, to mention one example.

However, there is also consideration of the fact that the calculation specification as such is not changed in order that the charging energy demand is calculated and the latter is then changed depending on the result comparison. In the simplest case, said result comparison is added up.

In accordance with one aspect, it is proposed that a deviation between exchange power actually exchanged and exchange power predefined by the exchange power profile is detected as an exchange power deviation. It is thus possible to detect how well the exchange power profile was predefined.

Here, too, it can furthermore be assumed that the charging energy demand is ascertained by means of the calculation specification mentioned. For this purpose, it is furthermore provided that depending on the exchange power deviation, the charging energy demand is ascertained for a further control time period. Here, therefore, an adaptation is effected on the basis of a difference between the predefined exchange power profile and the exchange power profile which was then actually established. In particular, the exchange power deviation can be integrated over the control time period for this purpose, or the difference between the exchange power that actually occurred and the predefined exchange power profile can be integrated and the result can be designated and used as an exchange power deviation.

In particular, it is provided that the calculation specification or the charging energy demand ascertained by means of the calculation specification is changed depending on the exchange power deviation. An adaptation such as was described above on the basis of the result comparison can be carried out here, too, but here on the basis of the exchange power deviation. The calculation specification can thus be adapted. The adaptation of the calculation specification can for example also be produced by a factor; by way of example, the factor 1.1 can be used if an adaptation by an increase of 10% is provided.

However, for all aspects which have been described regarding the adaptation of the calculation specification, there is also consideration of the fact that the calculation specification is adapted in an iterative method or in a feedback control loop such that it can ideally asymptotically approach a limit value with regard to the adaptation. By way of example, an adaptation factor initially having the value 1 can be provided for this purpose. If, whether by way of the exchange power deviation or the result comparison, a desired adaptation by 10% is then recognized, said adaptation factor is not increased by said 10%, but rather only by a fraction of this exemplary deviation of 10%, for example by one tenth. The adaptation value would then be increased by 1%, namely from 1 to 1.01.

If, as a theoretical assumption for better elucidation, the next profile is to be identical, then a deviation of 9% should arise since the adaptation factor has already resulted in an increase by 1%. This deviation of 9% would then likewise be taken into account with one tenth, such that the adaptation factor is increased from 1.01 to 1.019. In this regard, theoretically over many repetitions said adaptation factor could asymptotically approach the value of 1.1 if all the profiles have the same progression. Otherwise, it correspondingly approaches some other value corresponding to an average deviation.

This behavior can also be referred to as first-order delay behavior. It is quite generally proposed that the adaptation of the calculation specification is effected such that it has an adaptation factor that can be tracked progressively by way of a behavior of a first-order delay element.

In accordance with one aspect, it is proposed that at least one of the power units is embodied as a controllable electrical consumer without an electrical storage device, and said at least one power unit can thus also implement a functionality that has already been described above with regard to a controllable consumer.

A charging infrastructure is additionally proposed. Such a charging infrastructure is provided for exchanging an exchange power with an electrical supply network, wherein:
  a plurality of power units for outputting or taking up electrical power are connectable to the charging infrastructure in order to exchange electrical power between the power units and the electrical supply network via the charging infrastructure, and
  a plurality of the power units are in each case embodied as an electric vehicle, such that a plurality of electric vehicles are in each case connectable to the charging infrastructure in order to exchange electrical power between the electric vehicles and the electrical supply network via the charging infrastructure and thereby to charge or discharge the electric vehicles,
and the charging infrastructure has a central control unit prepared for:
  determining an energy predefinition for a control time period, which predefines at least the quantity of energy which the charging infrastructure is intended to draw from the electrical supply network in the control time period,
  predefining a power limitation, which specifies at least one limit for the exchange power which can be provided by the charging infrastructure,
  predefining an exchange power profile (P(t)) depending on
  the energy predefinition (E(t)) and
  the power limitation, wherein
  the exchange power profile predefines for the charging infrastructure a temporal profile of the exchange power for the control time period,
  determining partial power profiles depending on the exchange power profile, which predefine in each case for one of the power units a temporal profile of a partial exchange power in the control time period, wherein the sum of all the partial power profiles substantially corresponds to the exchange power profile, and
  providing the partial exchange powers by means of the power units depending on the predefined partial power profiles in order thereby to provide the exchange power between the charging infrastructure and the electrical supply network.

In particular, it is provided that the charging infrastructure, in particular its central control unit, is prepared to carry out a method in accordance with any of the embodiments described above. The charging infrastructure can thus achieve the advantages described in association with these embodiments or aspects.

A charging station comprising such a charging infrastructure is additionally proposed.

BRIEF DESCRIPTION OF THE SEVERAL VIEWS OF THE DRAWINGS

The invention is explained in greater detail by way of example below with reference to the accompanying figures.

DETAILED DESCRIPTION

Figure 1:
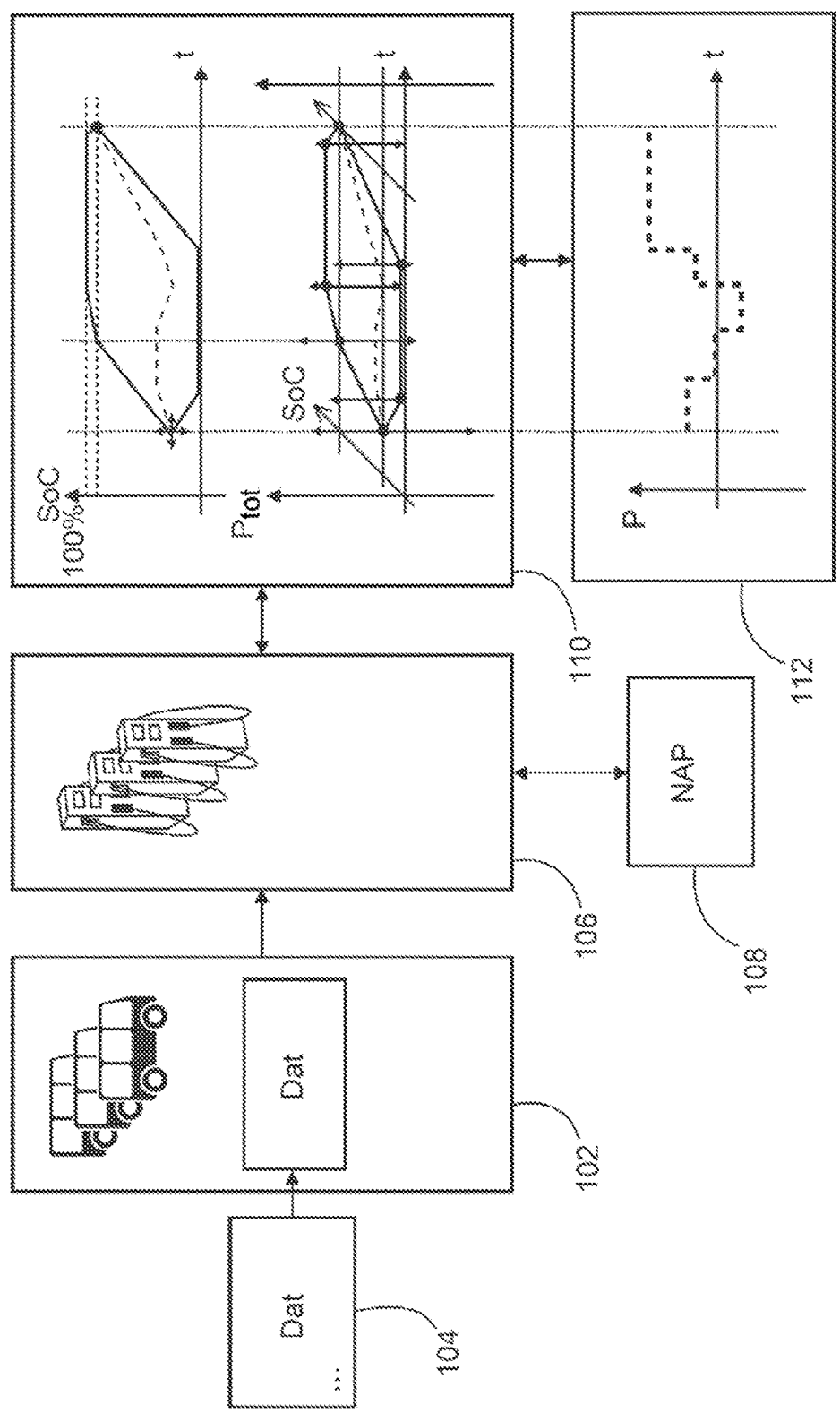
FIG. 1 shows a flowchart for illustrating the proposed method.

The flowchart in FIG. 1 is intended to elucidate the basic sequence of the proposed method. One concept in the method is to utilize storage capacities of a fleet with electric vehicles in order thus, in a demand-dependent manner, temporarily to make power available to an electrical supply network and also to control, in a targeted manner, the drawing of electrical power from the supply network for the purpose of charging the storage devices (e.g., batteries) of the electric vehicles of the fleet taking account of the electrical supply network. Each electric vehicle forms a power unit. The method also makes it possible to achieve an electricity price optimization. The fleet can thus be controlled such that it procures the required charging current at the best possible price and complies with the technical boundary conditions in the process. It has been recognized in particular that good planning of the technical resources is important for this, and that can be achieved by means of the proposed method.

The fleet of electric vehicles is represented by the fleet block 102. In this case, the fleet block includes information concerning the electric vehicles. This information includes information about the storage devices of the respective electric vehicle, namely detailed information, i.e., individually for each storage device of each electric vehicle. Also included is information concerning states of charge of the electrical storage devices which the respective storage device should have before the electric vehicle starts, particularly in the morning. This is also based on the concept, in particular, that the fleet of electric vehicles is used for comparatively well planned tasks, such as, for example, as an electric bus of a transport service for carrying out local public transport, to mention just one example.

Accordingly, information concerning departure times of the respective electric vehicles may be known in the fleet block 102. The departure times determine in particular when the state of charge of the respective storage device must be attained. However, the departure time also determines the time from when the storage device of the corresponding electric vehicle is no longer connected to the electrical supply network.

However, the fleet block may also contain information about what maximum charging power or maximum discharge power each of the storage devices respectively has. This information mentioned can be stored in the fleet block 102, in which case it can also be updated.

Furthermore, an input data block 104 is represented in an illustrative manner. Said input data block 104 includes in particular items of information or data which are highly variable, in particular those which may change daily and/or may be updated daily. They include a timetable for the electric vehicles if such a timetable is present, which can be present as a bus timetable if the electric vehicles of the fleet are electric buses. However, weather data, in particular a weather forecast, can also be provided by said input data block 104. Such data are input into the fleet block 102 and can be combined or computed together with the data present in the fleet block 102. In this case, from such input data such as the bus timetable it is possible to effect calculation or at least estimation of a time when the respective electric vehicle arrives in the fleet and is then ready for taking up electrical power from the electrical supply network or for outputting electrical power to the electrical supply network.

A state of charge of each electrical storage device at the instant when the corresponding electric vehicle arrives at the fleet can also be calculated. For this purpose, it is possible to use the data of the input data block 104 and, in addition, from available data of the fleet block 102, it is possible to calculate further data such as, in particular, the state of charge or expected state of charge of the electric vehicle when the latter arrives in the fleet. In particular, knowledge about the storage device, in particular its capacity, can be used for this calculation. This information is then taken from the fleet block 102.

It is proposed in this way to create a prediction or forecast. That can also be effected in the fleet block 102. It should be noted at this juncture that in principle the method can also be implemented in a different way than having necessarily to use the blocks explained, such as the fleet block 102 and the input data block 104. These blocks can also be linked differently, for example, or a plurality of input interfaces can be present in order to receive corresponding input data. By way of example, it may be expedient to obtain a weather forecast from a different source than the bus timetable or some other timetable. In this respect, the flowchart in FIG. 1 serves to elucidate the basic principle.

The prediction or forecast can then be passed to a charging infrastructure of the fleet. Said charging infrastructure is represented by the infrastructure block 106. In this case, the infrastructure block 106 can contain information concerning the charging infrastructure, namely in particular a maximum charging power which can be predefined by corresponding charging terminals. Said charging terminals are likewise part of the charging infrastructure. An availability of the electrical storage devices may also be known in the infrastructure block 106, particularly by virtue of the charging terminals each providing the information regarding whether an electric vehicle is connected to them, optionally also what kind of vehicle or what kind of storage device.

In part these data also arise from the electrical storage devices and the data can thus optionally be obtained from the fleet block 102.

The infrastructure block 106 additionally acquires the forecast data, namely the respective arrival times of the electric vehicles at the charging terminals and likewise the individual states of charge of the electric vehicles as soon as they arrive at the charging stations and are connected. These data are communicated as a forecast and processed further.

A network connection block 108 is additionally provided, which can make available in particular information about the electrical supply network and about network connection points used. The network connection points are those via which the charging terminals are ultimately connected to the electrical supply network. In this case, the charging infrastructure can be connected to the electrical supply network via one or more network connection points.

The network connection block 108 can provide data about a maximum infeed power, a target voltage and a target reactive power. The maximum power, which can also be referred to as maximum exchange power, is that power which can maximally be fed into the network or which can maximally be drawn from the electrical supply network. The target voltage is, in particular, a voltage of the electrical supply network at the respective network connection point. A target reactive power can be a reactive power which is predefined by a network operator and/or one which arises from data of the electrical supply network. The latter can include a magnitude of the reactive power to be fed in, which can be determined depending on the present network voltage.

All these data can be provided, namely to the infrastructure block 106 in accordance with the flowchart in FIG. 1. However, here as well such a block division need not necessarily be implemented.

The network connection block 108 additionally illustrates that both the power, namely active power, that can be provided by the electric vehicles or their storage devices and a reactive power that can be provided are output to said one or more network connection points in order, via same, to be fed into the electrical supply network or to be drawn from the electrical supply network.

From these data, it is possible, particularly in the infrastructure block 106, to determine or accept a maximum exchange power for maximum exchange with the electrical supply network. A maximum available active power can also be determined. The latter can depend in particular on the states of charge of the electric vehicles. The same applies to the available reactive power, which, although requiring little storage capacity of the electrical storage devices, nevertheless does require at least a little storage capacity and additionally also requires free capacities for feeding corresponding current into the electrical supply network.

For coordinating the individual storage devices of the electric vehicles of the fleet in order then however to be able to offer a common exchange power of the fleet to the electrical supply network, a charging control unit is provided, in particular, which can also be referred to as an aggregator or can contain an aggregator.

With the information explained above, said charging control unit or the aggregator creates a state of charge range. That is illustrated in the aggregation block 110. The aggregator can be part of a central control unit, or form the central control unit.

All these items of information explained above with regard to FIG. 1 are used by the aggregator, represented by the aggregation block 110, in order to determine a state of charge range. In particular, it is proposed to determine a forecast for such a state of charge range. A state of charge range is spanned as a range or band over the summation state of charge and time. That is indicated in the upper diagram in the aggregation block 110, where the summation state of charge on the ordinate is plotted against time on the abscissa.

In this case, the state of charge range is formed by an upper limit and a lower limit. The summation state of charge progresses in this range, i.e., between said upper limit and the lower limit. The state of charge range can thereby be predefined as a flexibility range.

Details in respect thereof and also in respect of the lower diagram of the aggregation block and also in respect of the exchange power block 112 illustrated underneath the aggregation block 110 are explained more specifically further below together with FIG. 2.

In any case the aggregator, this being illustrated by the lower diagram in the aggregation block 110, can predefine different exchange powers and thus exchange energies at different times, which can be represented as a third dimension in the diagram. Such possible exchange powers or quotas for exchange powers can be transferred to the exchange power block 112. Likewise, on the basis of availabilities or offered supplies in the electrical supply network, the exchange power block 112 can predefine exchange power at different times and thus predefine a profile of the exchange power. That is indicated in the diagram of the exchange power block 112, according to which different power level steps as a function of time are proposed. However, the profile of the exchange power need not progress in steps. It could also progress continuously.

Such a calculation or predefinition of power packets or profiles for the exchange power can be effected depending on the state of charge range and the data which the network connection block 108 provides or which have been explained above in association with the network connection block 108.

In this respect, the power block 112 or the profile of the exchange power as represented by way of example therein can be understood as a result or at least an interim result or a partial result of the proposed method. From the data about the fleet in accordance with fleet block 102, the data of the charging infrastructure in accordance with the infrastructure block 106, together with the data provided by the input data block 104, a state of charge range can be determined, in particular predicted. The state of charge range can be predefined as a flexibility range for this purpose.

On the basis of said state of charge range, illustrated in the upper diagram of the aggregation block 110, a profile of the exchange power over time can be determined, namely as an exchange power profile. That can be done using data about the electrical supply network regarding demand and supply, in particular, which demonstrate when an exchange power is advantageous and at what level. For this purpose, the state of charge range offers a variation range, which can also be designated or predefined as a flexibility space or flexibility range, and thereby predefines the framework within which such a profile of the exchange power can be predefined. In this case, the exchange power is predefined such that the summation state of charge remains in the state of charge range.

Figure 2:
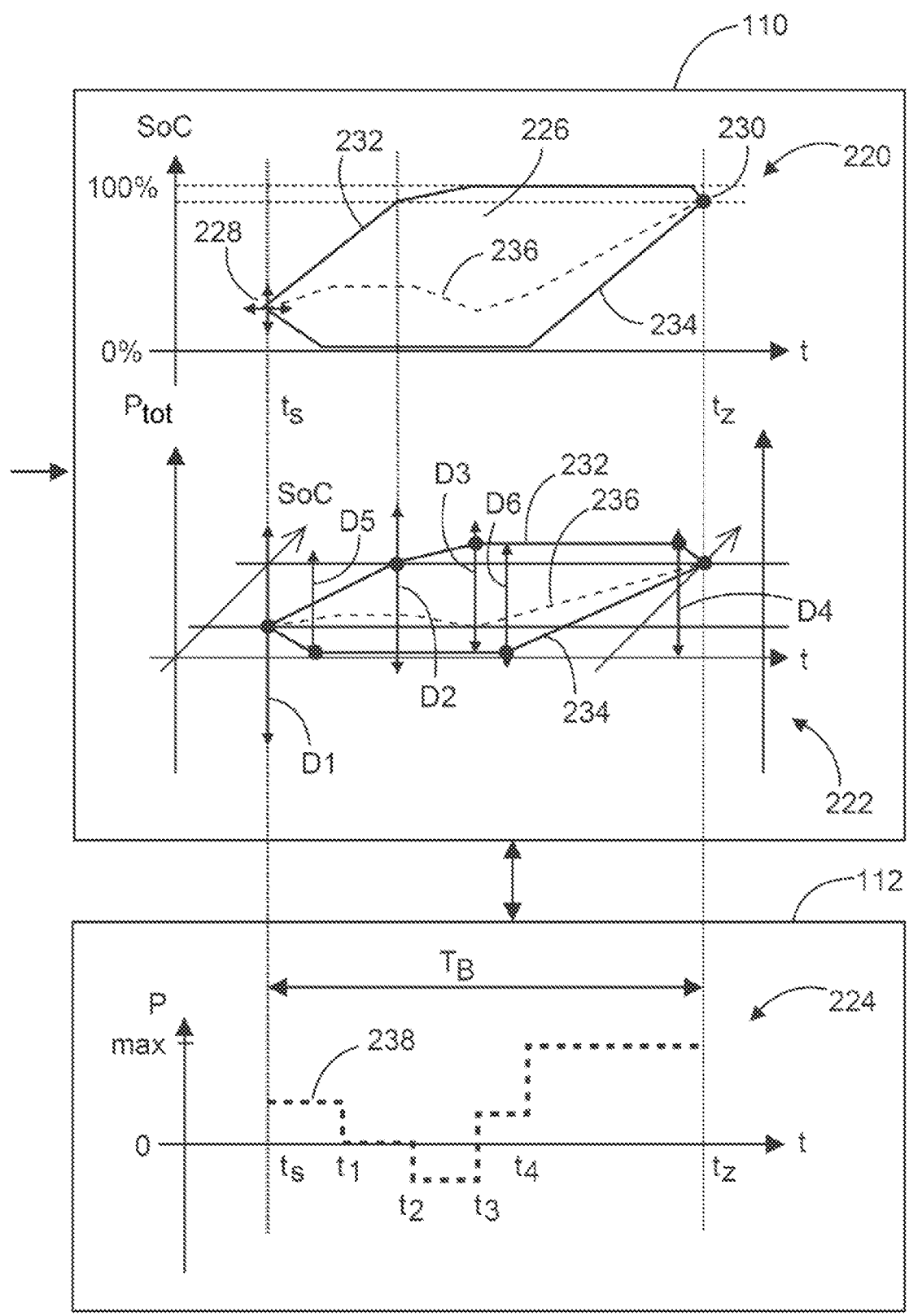
FIG. 2 shows an excerpt from the flowchart from FIG. 1 for illustrating a state of charge range and its application.

FIG. 2 shows an excerpt from the flowchart from FIG. 1, namely the aggregation block 110 and the exchange power block 112. The aggregation block 110 has a state of charge diagram 220 in the upper region, said diagram illustrating a state of charge range. A variation diagram 222 is illustrated in the lower region of the aggregation block 110, said diagram being based on the state of charge diagram 220 and additionally indicating by way of example a few variation possibilities for exchange power.

An exchange power diagram 224 is illustrated in the exchange power block 112, said diagram illustrating a possible profile of an exchange power over time, i.e., an exchange power profile. All these three diagrams, namely the state of charge diagram 220, the variation diagram 222 and the exchange power diagram 224, have the same time axis. In particular, for illustration purposes, a start charging instant $t_s$ and a target charging instant $t_z$ for the state of charge range are depicted and these instants, which can also be referred to as start instant and target instant, respectively, are also depicted by corresponding vertical lines in the other two diagrams. The start charging instant $t_s$ and the target charging instant $t_z$ thus span the providing time period $T_B$, which is depicted only in the exchange power block 112 for the sake of better clarity.

In the state of charge diagram 220, in principle, the summation state of charge SoC is plotted against time t. The state of charge range 226 is represented in this diagram. The state of charge range 226 begins with a start charging point 228 and ends with a target charging point 230. The start charging point 228 is characterized by a value of the summation state of charge SoC and the start charging instant $t_s$. Both the level of the summation state of charge and the start charging instant $t_s$ can vary and are preferably determined by a forecast, as has been explained in association with FIG. 1 and there in particular the fleet block 102 in association with the data provided by the input data block 104.

From the start charging point 228, the summation state of charge SoC then progresses to the target charging point 230. The target charging point 230 is characterized by the target charging instant $t_z$ and by the associated value of the summation state of charge SoC.

While the start charging instant $t_s$ is variable and depends on when the electric vehicles actually returned to the fleet, the target charging instant $t_z$ can be defined quite accurately, specifically when the electric vehicles depart, in particular depart in the morning in accordance with a timetable.

The profile on which the summation state of charge SoC is led from the start charging point 228 to the target charging point 230 is comparatively flexible. That is exactly what was recognized and for this purpose it is proposed merely to predefine limits which span a flexibility space or flexibility range, namely which span the state of charge range 226. In this case, the state of charge range 226 has a time-dependent upper limit 232 and a time-dependent lower limit 234. The time-dependent upper limit 232 can reach the value of 100% at times. All the electrical storage devices would then be completely fully charged. Moreover, the lower limit 234 can reach the lower value of 0% at least at times. This serves for illustration, however, and often it is not advisable for all the storage devices to be completely discharged because they may incur damage as a result. Consequently, a different value than 0%, for example 20%, can also be chosen as the minimum value of the lower limit 234. The same applies to the upper limit 232, for which a maximum value can be chosen as 90% instead of 100% for example. This minimum value and this maximum value can also be chosen depending on corresponding values of the individual electrical storage devices.

The state of charge diagram 220 thus illustrates that the upper limit 232 and the lower limit 234 span a state of charge range 226 in which the summation state of charge can vary. A summation state of charge profile 236 is depicted by way of example in this respect.

Moreover, the state of charge diagram 220 also reveals that as a result of a variation of the start charging point 228, the state of charge range 226 varies as well, at least in its initial range in the vicinity of said start charging point 228. Accordingly, the state of charge range 226 also depends on the forecast of the summation state of charge SoC at the beginning of the state of charge range 226, and it also depends on the forecast with regard to the start charging instant $t_s$.

The variation diagram 222 includes the state of charge diagram 220, the coordinate axis for the summation state of charge SoC pointing into the plane of the drawing. The time axis has remained and a coordinate axis for the power P has been added. In the variation diagram 222, said power P indicates how much exchange power can be output or taken up at what corner point of the upper limit 232 or lower limit 234. The double-headed arrows D1-D6 are depicted in this respect. Said double-headed arrows thus indicate values for P and thus a power limitation in a possible way.

The double-headed arrow D1 concerns the start charging point 228 and indicates that at that moment both positive and negative exchange power can be offered equally. The double-headed arrow D2 is depicted at the upper limit 232 and there the exchange power can still be increased, but in particular the exchange power can also be offered to a still much greater extent with a negative value. In the case of the double-headed arrow D3, and the same applies to the double-headed arrow D4, the upper limit 232 has arrived at its maximum value and then only negative exchange power can still be offered. In the case of the double-headed arrow D4 an additional factor is that negative exchange power not only can be offered but must be offered in order still to reach the target charging point 230. However, the target charging point 230 can also be predefined as a minimum value and then the summation state of charge could also lie above this target charging point 230 and then the double-headed arrow D4 would also only indicate a possible negative exchange power. The exchange power could also be zero, but it cannot be positive, which is indicated by the double-headed arrow D4.

It should be repeated at this juncture that a positive exchange power is one which involves the storage devices being charged, i.e., a positive exchange power is one which involves power being drawn from the network and stored in the electrical storage devices.

The double-headed arrows D5 and D6 each indicate that only a positive exchange power is possible because here the lower limit 234 has already reached the minimum value.

In this respect, these double-headed arrows D1-D6 merely indicate possibilities and help to define a framework in which the exchange power can then actually be varied.

The summation state of charge profile 236 thus indicates a series of many summation states of charge. For each of these summation states of charge, that is to say for each point on the summation state of charge profile 236, an interval or a minimum and a maximum value can be predefined. For each value, a trend for the summation state of charge then also results which leads to a profile through the state of charge range which makes other exchange powers possible. Constant changes can result here in a continuous profile. When an electric vehicle departs or arrives, however, then the summation state of charge changes abruptly. The summation state of charge can also be referred to synonymously as total state of charge.

A profile of an exchange power, i.e., an exchange power profile 238, is then illustrated by way of example in the exchange power diagram 224 of the exchange power block 112. Accordingly, at the start charging instant is the exchange power and thus the exchange power profile 238 begins with a positive value. In other words, power is drawn from the electrical supply network and used for charging the storage devices. The summation state of charge or the summation state of charge profile 236 accordingly rises. That can be discerned both in the state of charge diagram 220 and from the variation diagram 222. At the instant $t_1$ the exchange power profile 238 falls to zero and the summation state of charge profile 236 accordingly has a horizontal region.

The feeding of power into the electrical supply network has been planned, i.e., predicted, and is then also implemented at the instant $t_2$ because a particularly high demand was predicted here, which may also result from the fact that a large generator is switched off at night, when little power is actually required, such that a power demand may nevertheless arise in the electrical supply network.

This negative exchange power starting from the instant $t_2$ is also discernible from a falling edge in the summation state of charge profile 236.

At the instant $t_3$ the exchange power is changed to a positive value again and the summation state of charge accordingly rises again. At the instant $t_4$ the exchange power is increased once again, such that the summation state of charge profile 236 also progresses even somewhat more steeply starting from $t_4$. In this way, finally, all the storage devices are then fully charged, as a result of which the summation state of charge profile 236 reaches the target charging point 230.

In particular, it is proposed that the exchange power profile 238, as illustrated by way of example in the exchange power diagram 224, is predetermined as a forecast. The network operator or a network control unit can then employ this forecast and set the network management in line therewith.

Nevertheless, particularly in the range of $t_s$ to $t_4$, there is the possibility of varying the exchange power ad hoc, that is to say of changing the actually predefined exchange power profile 238. That can occur for example if a power demand or else a power surplus unexpectedly occurs in the electrical supply network. Suchlike can for example also be recognized as a result of a change in the network frequency. In this regard, it is proposed that if the network frequency of the electrical supply network exceeds a predetermined limit value, the exchange power is increased, i.e., more power is drawn from the network, and/or that if the network frequency falls below a lower frequency value, the exchange power is reduced, i.e., more exchange power is fed into the electrical supply network.

Figure 3:
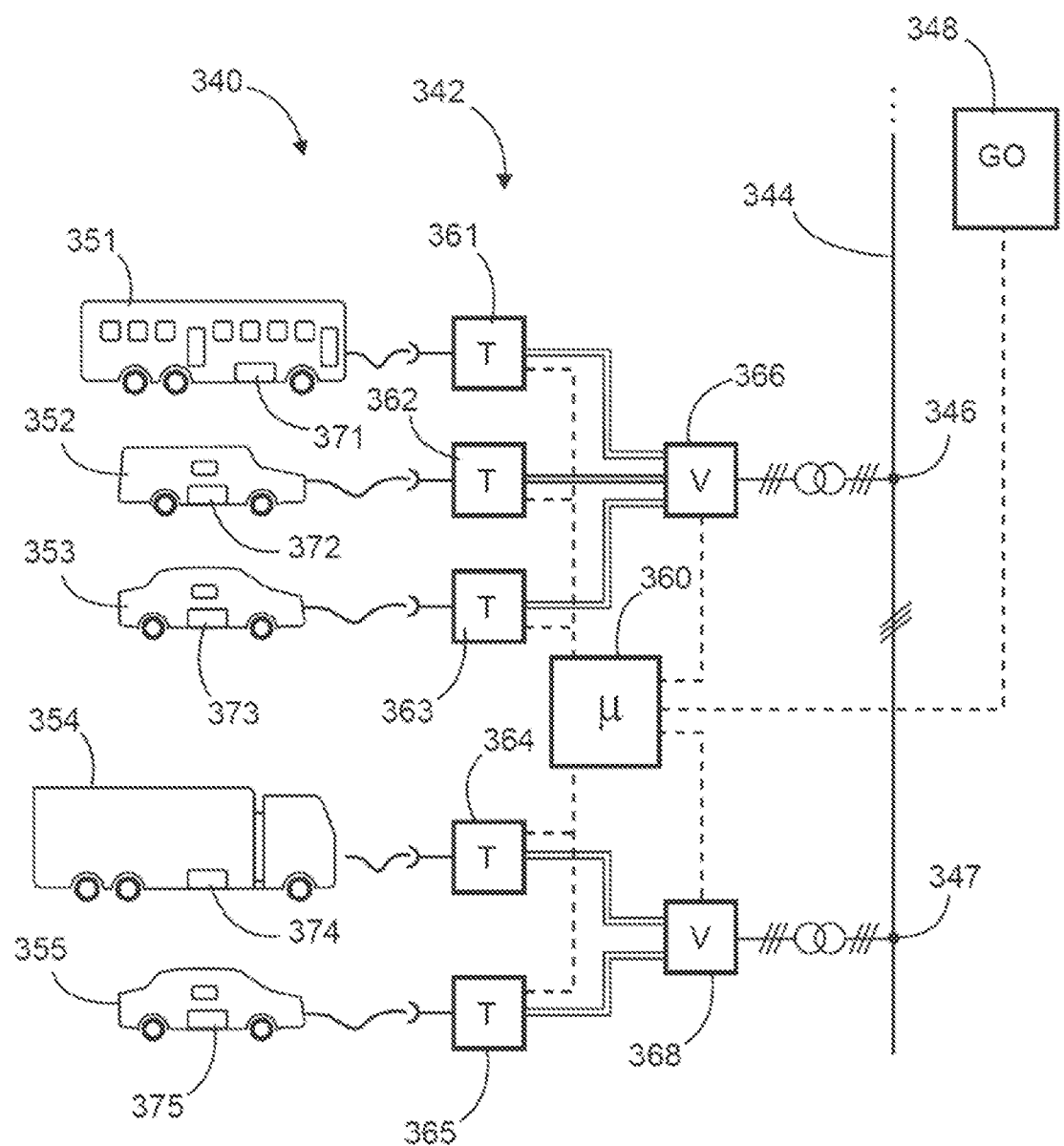
FIG. 3 schematically shows a fleet with a charging infrastructure.

FIG. 3 shows a fleet 340 with a charging infrastructure 342, which is connected to an electrical supply network 344 via two network connection points 346 and 347. The electrical supply network has a network control unit (e.g., network controller) 348, which can control the electrical supply network 344. The network control unit 348 can also be operated by a network operator.

The fleet 340 has by way of example five electric vehicles 351-355, each of which is connected to one of the charging terminals 361-365. The charging terminals can be connected to the electrical supply network 344 via distribution nodes 366 and 368 via a respective network connection point 346 and 347.

Consequently, the three electric vehicles 351-353 can feed into the electrical supply network 344 or draw power therefrom via the network connection point 346 and the electric vehicles 354 and 355 can feed power into the electrical supply network 344 or draw it therefrom via the network connection point 347.

A charging control unit (e.g., charging controller) 360 is nevertheless provided, which can control each individual charging terminal 361-365 and thus each storage device of the electric vehicles 351-355. The charging control unit 360 can be part of a central control unit (e.g., central controller), or form the latter. Moreover, as an optional possibility, provision is made for the charging control unit also to be able to control the distribution nodes 366 and 368. Moreover, provision is made for the charging control unit 360 to be able to communicate with the network control unit 348. For this purpose, the charging control unit 360 can pass information to the network control unit 348 and also acquire information therefrom.

In principle, the information connections between the charging control unit 360 at one end and the charging terminals 361-365, the distribution nodes 366 and 368 and also the network control unit 348 are illustrated in dashed fashion. Via the other lines, depicted in solid fashion, transmission of power or energy is possible.

The charging control unit 360 may have stored items of information about properties of the charging infrastructure 342 and/or receive them as present data. Moreover, it may have stored items of information about properties of the electrical storage devices of the electric vehicles 351-355 and, in particular via the charging terminals 361-365, acquire and process present information about the state of charge and optionally further properties of the respective storage devices of the electric vehicles 351-355.

Thus, the charging control unit 360 can be used to control overall the exchange power exchanged between the charging infrastructure 342 and the electrical supply network 344. In this respect, said exchange power is the sum of the partial exchange powers which are exchanged with the electrical supply network 344 via the network connection point 346 and the network connection point 347.

In addition, for illustration purposes, electrical storage devices (e.g., batteries) 371-375 are indicated in the electric vehicles 351-355.

A method is thus proposed which advantageously utilizes the capacity of a fleet of electric vehicles. It is therefore possible to provide system services, particularly for network backup. For this purpose, a reserve energy can be offered and an arbitrage transaction is also possible; both can be offered to the electrical supply network or a network operator.

The method can basically be applied to any charging infrastructure and to structures with DC charging terminals having a fast charging capability in a logistical interconnected network. A bidirectional charging infrastructure is utilized. A combination with stationary storage devices, at least with one stationary storage device, can advantageously be effected.

It has been recognized that a charging infrastructure which can always exchange the full charging power with the electrical supply network, which is also referred to as network for simplification, at any time without restrictions requires a great overdimensioning of the network infrastructure and thus causes higher connection and network utilization costs. It has additionally been recognized that the electricity price procurement can also be optimized by shifting or even feeding back energy. In the case of shifting the energy which is used for charging the electric vehicles, the energy required for charging is not retrieved as rapidly as possible, but rather is at least partly retrieved later and thus shifted to this later domain.

What can be achieved in particular as synergistic effects is that the combination of electricity procurement at a favorable price, the offering of system services and a lower demand on the network, and thus lower network fees and possibly lower network expansion, ultimately results in lower energy costs for operating the vehicles for the operator of the charging infrastructure.

It is thus also proposed, in particular, to improve a traditional charging infrastructure with simple load management.

The proposed technical solution makes it possible to achieve an electricity price minimization by better utilization of the networks and an increase in the commercial degree of utilization of the motor vehicles carrying storage devices. Additional revenue can be generated by the mobile storage devices of the electric vehicles being used for system services and an electricity arbitrage transaction when they are connected to the respective charging terminal or charging point. It is additionally proposed that the advantages described also be assessed taking account of application-specific wear costs. To that end, a wear indicator dependent on the respective state of charge and/or on the respective charging power can be ascertained and taken into account.

There is also the underlying concept, in particular, of carrying out an expedient aggregation of charging points or electrical storage devices, which can optionally be effected in interaction with further local storage devices or mobile storage devices. It has been recognized, in particular, that electric motor vehicles in local public transport can thereby use the electricity storage devices in a manner beneficial to the grid during charging.

In the proposed aggregation, which is described in particular in association with FIG. 2 and there in particular in association with the aggregation block 110, a technical aggregation is combined with a timetable and a state of charge and arrival prediction for the electric vehicles. This makes it possible to utilize a very large proportion of the storage capacity with a high availability for global and local system services and/or electricity arbitrage transactions.

It is proposed, in particular, to use the following input variables and boundary conditions for the aggregation, namely the storage capacity of each vehicle, which may also be referred to as rechargeable battery capacity, service life-relevant rechargeable battery characteristics, state of charge-dependent and power-dependent wear indicator, rechargeable battery quality, that is to say storage device quality, of the storage device of the corresponding electric vehicle, properties of the charging point of the electric vehicle, a prediction regarding the state of charge upon arrival of the vehicle or vehicles, a prediction with regard to the arrival time of the electric vehicles, a target state of charge as state of charge at the end of the state of charge range, that is to say when the electric vehicles are intended to depart again, departure times of the electric vehicles, wherein the last four input variables mentioned can be taken into account depending on a timetable, and a charging power from a bidirectional standpoint. The last point includes a rechargeable battery power, or storage device power, and/or a charging point power, i.e., takes account of properties of the electrical storage device and also of the charging terminal or of part of the charging infrastructure.

It is proposed, in particular, that the aggregator produces a flexibility space depending on the boundary conditions mentioned, said flexibility space corresponding to or including in particular the state of charge range in which the summation state of charge, the exchange power and the wear indicator develop over time. This flexibility space, flexibility range or state of charge range can also be understood or designated as a band. On the basis of such a band, a network operator or electricity trader can predefine an optimized electricity schedule via a network control unit. This takes account of the usage costs of the aggregated electricity storage devices, that is to say of the electrical storage devices of the vehicles, any present price, in particular the share price, local network usage costs and also opportunities for providing global and local system services, and also opportunities for an electricity arbitrage transaction.

To that end, the aggregator can receive the electricity schedule and control the individual charging points, specifically with connected mobile and/or stationary storage devices, such that the schedule is complied with, specifically even in the event of deviations from a previously created prediction.

In addition, on the basis of the flexibility space, a network operator can also directly request or use a system service, or offer the electricity trader a load transfer potential. Consideration is also given to the network operator predefining time-dependent power limits that are to be realized.

Figure 4:
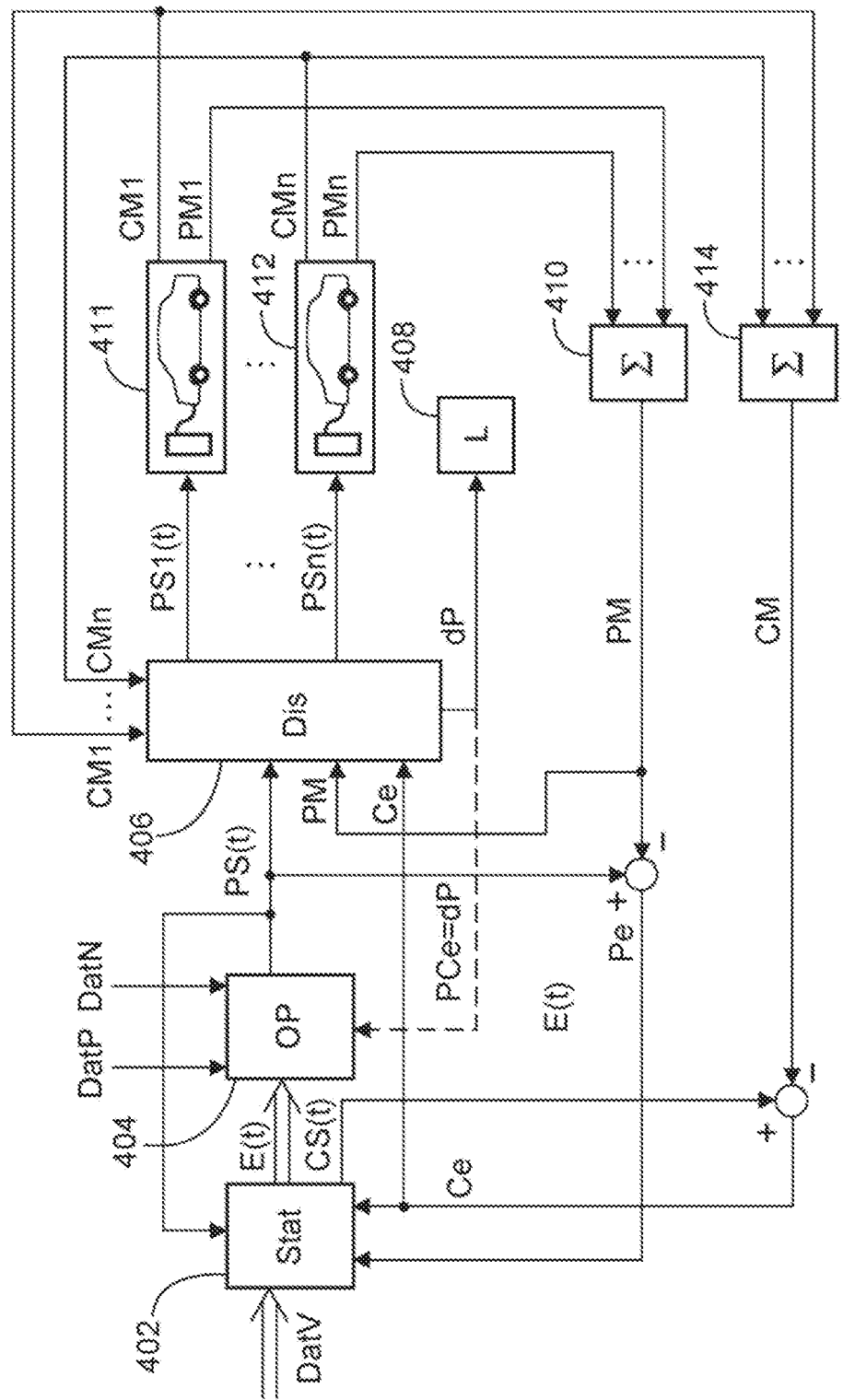
FIG. 4 shows a closed-loop control structure of a charging infrastructure as a schematic overview.
Figure 5:
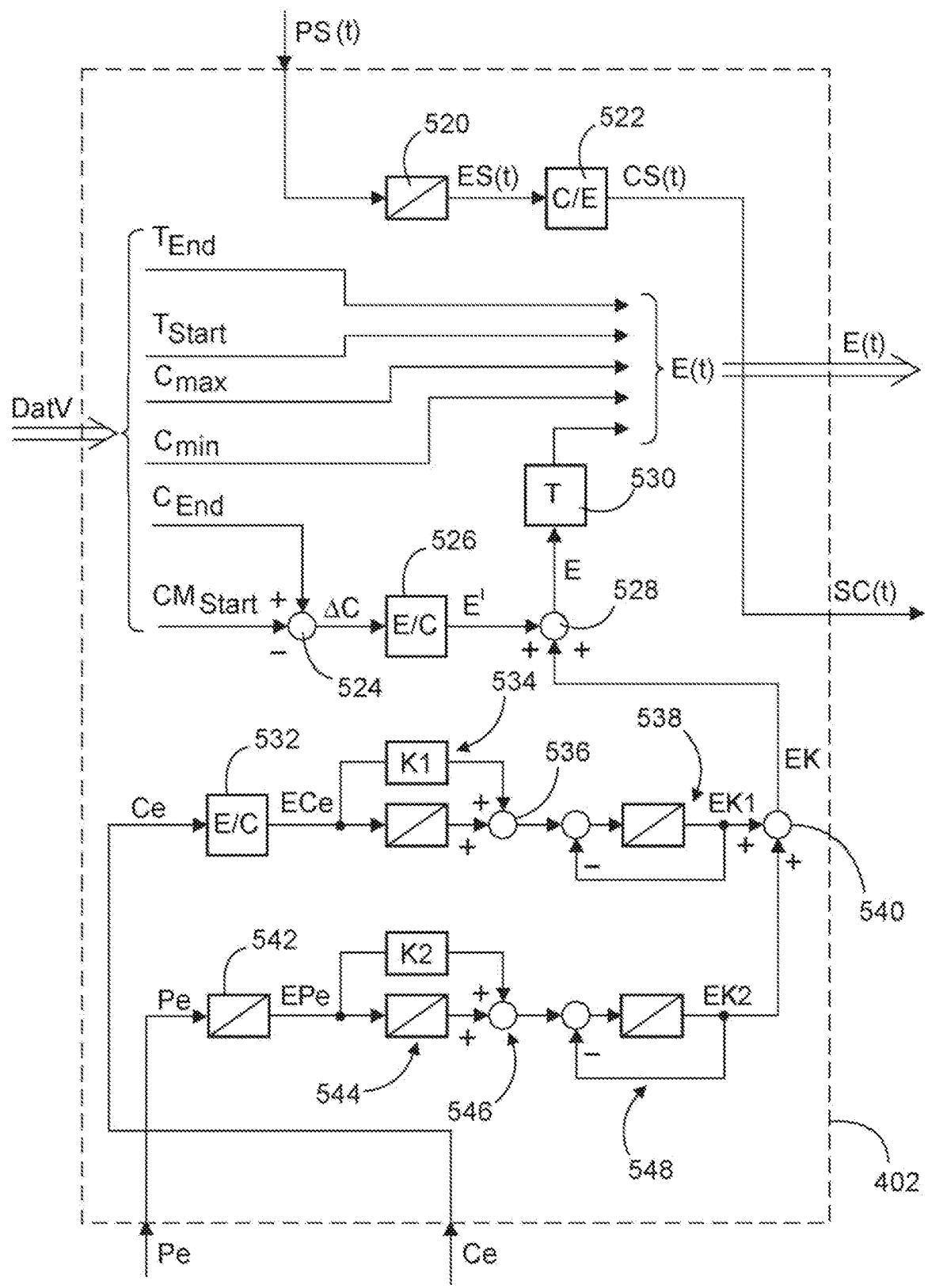
FIG. 5 schematically shows a closed-loop control structure of a predefinition block of the closed-loop control structure from FIG. 4.

The closed-loop control structure in FIG. 4 shows a predefinition block 402, in which in particular an energy predefinition is determined, which is designated there as E(t). This energy predefinition comprises in any case the quantity of energy which the charging infrastructure requires for charging its power units, that is to say in particular for charging its electric vehicles, namely for an imminent charging time period and thus for an imminent control time period. In the simplest case, the energy predefinition can predefine a simple value, namely how much energy the charging infrastructure requires. However, further values can also be contained, namely how much energy the charging infrastructure can temporarily output, that is to say can provide to the electrical supply network. In FIG. 4, the energy predefinition is identified as the output of the predefinition block 402 as an arrow with a double line, since this is intended to indicate that further information can be contained. What further information is considered will be explained further in FIG. 5. FIG. 5 will also explain what input data can be taken into account, said input data forming an input of the predefinition block 402 as DatV in FIG. 4. Here, too, in any case a plurality of data can be provided, which is indicated by the arrow with a double line.

The energy predefinition forms the input for a planning block 404. In this case, the planning block 404 can be realized outside the charging infrastructure, that is to say in particular outside a depot, for example, or outside a central control unit (e.g., central controller) that otherwise achieves the implementation of the control of the exchange power. In this regard, consideration is given to an external institution such as a network operator (e.g., network control unit (e.g., network controller) 348) or an electricity marketer realizing said planning block 404 or implementing the planning carried out therein.

The planning block 404 thus acquires the energy predefinition as input and, depending thereon, determines an exchange power profile PS(t) specifying when in the control time period how much power is output to the charging infrastructure or is even taken up by the latter at times. Said exchange power profile is thus to be predefined such that at least the required quantity of energy that forms the energy predefinition or is contained therein is achieved at the end of the control time period.

The network operator or marketer mentioned by way of example can substantially freely predefine the exchange power profile, but is tied to some boundary conditions. One boundary condition is that there are limits for the maximum power output or taken up. In the simplest case, this maximum power transmission, in terms of absolute value, can have a fixed value. Such a value is therefore predefined for the planning block 404 as DatP. That should be understood substantially symbolically, however, since in particular a fixed power limit can also be a fixedly stored value. Power limits can also change, if for example a network attachment point limits the magnitude of the exchange power and at different times different amounts of power have to be transmitted for purposes other than for provision for the charging infrastructure.

The design freedom that remains, however, for predefining the exchange power profile can be used in particular to take account of network requirements. In particular, the exchange power profile is predefined such that a large amount of power is transmitted to the charging infrastructure if a large amount of power is available, or if little power is requested otherwise in the electrical supply network. That is a special feature of the method and is utilized here. Such information about network requirements is symbolized as input variable DatN for the planning block 404.

A storage power error PCe is also indicated as a dashed possible input for the planning block 404. Here there is consideration, which will also be described in detail later, of the fact that a power enquiry is directed in particular to the network operator or marketer mentioned by way of example while the control time period is elapsing. That is taken into consideration if the predefined exchange power profile proves not to be sufficient, that is to say if not enough power or too much power is provided by the predefined exchange power profile P(t).

The predefined exchange power profile PS(t) is passed to a distribution block 406 and is additionally fed back to the predefinition block 402. The predefinition block 402 can determine therefrom in particular an expected state of charge profile CS(t) and can output this value, particularly in order then to compare it with an attained state of charge.

The exchange power profile P(t) is thus passed to the distribution block 406. The exchange power profile concerns the power which is to be exchanged overall between the charging infrastructure and the electrical supply network and which is intended to be used for charging or discharging in particular for many electric vehicles. Consequently, from this total power, in accordance with the exchange power profile, a distribution between many individual powers PS1(t)-PSn(t) is intended to be effected in the distribution block 406. The index n represents the number of power units used or in particular the number of electric vehicles or the number of charging terminals. Accordingly, two charging terminals with connected electric vehicle are identified as terminal blocks 411 and 412.

The distribution block 406 additionally outputs a power error dP. Said power error dP can be a deviation between required power and power predefined in accordance with the exchange power profile PS(t). Said power error can be compensated for by a controllable load 408 changing its own power consumption by this value, or a portion thereof. The controllable load 408 can also comprise an electricity generator and can also be referred to synonymously as a controllable consumer.

Via said distribution block 406, the power distribution between the individual electric vehicles in accordance with the terminal blocks 411-412 is thus controlled by open-loop or else closed-loop control. The actual implementation of the respective individual power predefinitions PS1(t)-PSn(t) is effected in each case in the terminal blocks 411-412, which of course are representative of n terminal blocks.

The charging processes are nevertheless also checked centrally and, for this purpose, each terminal block 411, 412 detects both the individual state of charge CM1-CMn and the power PM1 and respectively PMn actually taken up in each case. Here and also otherwise in FIGS. 4-7, the letter M thus denotes an underlying measurement or other detection.

During this monitoring, all detected individual powers PM1-PMn are added up in the summing block 410 to form an overall detected power PM, which is thus a summation power of the individual power. This summation power PM can be taken into account in the distribution block 406 in order possibly to readjust the power distribution. Details in this respect are described in FIG. 6. Taking account of the individual powers PM1-PMn is also considered in principle, but is regarded here as dispensable since the concrete implementation of the control of the individual powers is effected in the terminal blocks 411-412.

The detected individual states of charge CM1-CMn are likewise summed, namely in the summing block 414. This sum of the states of charge CM is output by the summing block 414 and can be compared with a state of charge profile CS(t), which can be predefined in the predefinition block 402. As a result, it is possible to ascertain a state of charge deviation Ce for the total state of charge, that is to say the sum of all states of charge. This control error of the total states of charge Ce can be taken into account in the predefinition block 402 in order to improve a future predefinition, namely in particular the energy predefinition. Details in this respect are also elucidated in FIG. 5.

Moreover, it is also proposed to ascertain a control error between the summation power and the predefined power in accordance with the exchange power profile PS(t), which control error is designated here as Pe and can likewise be taken into account in the predefinition block 402. An adaptation can be provided here, too, and is also elucidated in FIG. 5.

In addition, the individual states of charge CM1-CMn are also specifically taken into account in the distribution block 406. Here provision is made, in particular, for comparing the attained states of charge with predefined or computationally ascertained state of charge profiles, and possibly providing a readjustment. Details in this respect are elucidated in FIG. 7.

The blocks 402, 406, 410 and 414 or their functionalities can be contained, combined or realized in a central control unit (e.g., central controller) of a charging infrastructure.

FIG. 5 elucidates a simplified structure of the predefinition block 402 from FIG. 4. An energy profile ES(t) is determined from the exchange power profile PS(t) via an integrator 520. A profile of a total state of charge CS(t), designated as state of charge profile CS(t), can be determined from the energy profile ES(t) via the dimensioning block 522. The dimensioning block 522 is basically configured merely as a factor and this factor is dependent on all affected electrical storage devices, namely on their dimensioning. This factor can be calculated as a quotient between a state of charge and the quantity of energy required therefor. Consideration is also given to adapting this factor if, for example, properties of the electrical storage devices deteriorate as a result of wear, or improve again as a result of exchange for a new energy storage device. In this respect, the dimensioning block 522 takes account of only the totality of all the electrical storage devices for that moment. In principle, however, there is also consideration of the fact that this factor in the dimensioning block 522 need not be adapted if a sufficient number of electric vehicles and thus electrical storage devices are present which are regularly and uniformly maintained or, if appropriate, exchanged. In any case, the state of charge profile CS(t) thus calculated is output by the predefinition block 402.

Input data which can be taken into account in the predefinition block 402 are combined in the data vector DatV. This includes a starting total state of charge $CM_{start}$ expected at the beginning of the control time period, and an end state of charge $C_{end}$ desired at the end of the state of charge. The predefinition block 402 is intended to calculate in advance at least the desired quantity of energy as far as possible over 24 hours before the beginning of the control time period. For this propose, probability considerations lead to the starting state of charge $CM_{start}$. This includes empirical values regarding residual states of charge of the electric vehicles when they return to the charging infrastructure. By contrast, the end state of charge is a desired value and is 100% in the simplest case. However, it can also be chosen to be lower, for example 90%, in order thereby also to enable a leeway.

In any case, a difference between the end state of charge and the starting state of charge is formed at the summing point 524 and the resulting charge difference $\Delta C$ is likewise converted into an equivalent quantity of energy E' via a dimensioning block 526. This resulting quantity of energy E' could already be the quantity of energy to be requested. In order to improve the control of the exchange power, however, it is proposed here to take account of possible deviations from earlier profiles and to apply correction values ascertained therefrom to the summing point 528. The result is then the quantity of energy E to be predefined.

A time block 530 is provided merely symbolically, which is intended to indicate that the desired quantity of energy need not be constantly output continuously, but rather is output in each case for control time periods to be planned, that is to say time-discretely. Alternatively, however, they can also be output continuously and be evaluated only as necessary at the receiver end. This concept that values should not need to be output immediately by the predefinition block 402 is also applicable, in principle, to the other values that are output, without such a time block 530 being depicted there. In any case, the quantity of energy E to be predefined can be part of the energy predefinition E(t).

As further input parameter, a minimum state of charge $C_{min}$, a maximum state of charge $C_{max}$, a start time $T_{start}$ and an end time Tend are provided. The last-mentioned times can also be referred to as start instant and target instant, respectively. These data can be concomitantly output as part of the energy predefinition, which is illustrated by FIG. 5. However, consideration is also given to converting these data even further. In this regard, the minimum state of charge in particular together with the starting state of charge can be converted into an energy lower limit and output. Such an energy lower limit would designate how much energy can necessarily be output temporarily by the charging infrastructure, namely before the electrical storage devices are damaged. The same applies to the maximum state of charge, particularly if the latter lies above the end state of charge, that is to say that if the end state of charge is 90% and the maximum state of charge is 100%, a maximum quantity of energy can also be calculated therefrom. Such a maximum quantity of energy specifies how much energy can maximally be taken up by the charging infrastructure. This value can be higher than the requested energy, namely precisely when there is no requirement for all the electrical storage devices to be charged to 100%. A corresponding leeway can be predefined as a result.

The start time and the end time define the control time period in which the power exchange is intended to take place. These two times can also be fixed values, for example always in the evening around 6 p.m. as start time and in the morning around 5 a.m. as end time. In this respect, the times or their designations refer to the charging process and not to the time period in which the electric vehicles perform their service.

A further input of the predefinition block 402 is a control deviation of the total state of charge Ce. The latter can be used in the predefinition block 402 for correcting a control error or else for an adaptation of the process of determining the energy predefinition. FIG. 5 illustrates a variant in this respect.

Accordingly, the control deviation of the total state of charge Ce is passed via a dimensioning block 532, the value of which can moreover correspond to the inverse value of the dimensioning block 522 in order to determine a control deviation of the total energy ECe. There is yet another possibility for determining a control deviation of the energy, which will also be described below and is illustrated in FIG. 5.

Said control deviation of the quantity of energy ECe is thus based on the monitoring of the total state of charge, which is indicated by the maintaining letter C. In any case, in the variant proposed here, said control deviation is passed into a first proportional-integral (PI) controller 534. Said first PI controller thus has an integrator and a proportional (P) component. It has the effect that the control deviation at the output of said first PI controller 534 can retain a permanent value at the summing point 536, even if a control error is no longer initially present, that is to say even if the control deviation of the total state of charge Ce is zero.

The underlying concept here is that first PI controller 534 determines a correction value to be applied, which specifically is added to the quantity of energy E' to be predefined, which resulted solely from the comparison between starting and end states of charge, for correction purposes. It should be assumed that power losses occur in the charging infrastructure, such that in principle ever more energy is required than results computationally solely from the comparison between starting and end states of charge. This energy difference is thus intended to be applied permanently. However, other errors can also be taken into account, which can in particular also result from the estimation concerning the starting state of charge $CM_{start}$. The system thus becomes capable of learning, ascertains deviations and also retains them.

Particularly taking account of the fact that the estimation of the starting state of charge $CM_{start}$ is also based on probability considerations and may therefore also have a statistically caused fluctuation, a first first-order delay element 538 is additionally provided. The result is a first energy correction value EK1, which can be applied as energy correction value via the summing point 540 and the further summing point 528.

A second energy correction EK2 can additionally be taken into account at the summing point 540.

The second energy correction value EK2 is based on a control deviation of the total power. The determination of this total power Pe is shown and described in FIG. 4 and here forms an input variable of the predefinition block 402. This control error of the total power Pe is passed via the integrator 542, thus resulting in a control error of the energy EPe, which here however is based on the power measurement or at least power detection of the individual powers, instead of the detection of the individual states of charge.

Otherwise, however, it is proposed here, too, to pass said control error of the energy EPe via a PI controller, namely the second PI controller 544, which can lead to a permanent correction value at its output, namely at the summing point 546. Here, too, for reasons mentioned above, a second first-order delay element 548 is also provided, which outputs a second energy correction value EK2. Said second energy correction value EK2 is thus added to the first energy correction EK1 at the summing point 540, resulting in a common energy correction value EK, which is added to the calculated energy E' at the summing point 528 in order to obtain the quantity of energy E to be predefined.

The structure in FIG. 5 is an example of one embodiment and can also be used in this way in principle. In particular, consideration is actually given to jointly determining and adding up the two energy correction values EK1 and EK2. However, consideration is also given to carrying out only one of the two calculations. Since both correction values are determined by a PI controller, the respectively active PI controllers have the effect that the corresponding control deviation is corrected.

In order to prevent these two controllers from potentially counteracting one another, one of the two controllers can be deactivated. Preference should be given in principle to the controller which ascertains the correction value on the basis of the control deviation of the total state of charge CE, since ultimately a desired total state of charge is intended to be achieved. The other values are essentially means to an end in that respect. However, particularly if a state of charge may be measured poorly, taking account of the control error of the power may also be considered.

It should be emphasized once again, particularly with reference to the time block 530, that particularly the determination of the energy correction values EK1 and EK2 or EK is provided particularly for a recurring process. The energy predefinition is predefined for a control time period, that is to say a charging cycle of the charging infrastructure. On the basis of this, the exchange power profile is predefined for this control time period and, when the time has come and this control time period begins and fully elapses, the intention is to provide a corresponding exchange power in accordance with the exchange power profile.

The electrical storage devices are then charged and at the end of the control time period it is discovered whether the total state of charge has been established as desired, or whether deviations are present. If deviations are present, that is to say if in particular a control deviation of the total state of charge CE is present, this has effects on the energy predefinition for the next or a further control time period. Consequently, a control loop is thus iterated again.

To put it simply, an energy predefinition is determined in advance for a night and the exchange power profile is likewise calculated in advance for this night. As soon as this night begins, which may also be more than 24 h after the advance calculation, this advance calculation is implemented in the night. The next morning a check is made to establish how well this process has functioned. The improvement derived from the deviation of this last night may then take effect on the next night or the night after next.

Since an exchange power profile is regularly intended to be planned 24 hours beforehand in order that the network operator can prepare for that, planning regularly takes place at the end of one night not for the next night, but rather for the night after next. However, that does not require any change to the closed-loop control structure, particularly as shown and elucidated in FIG. 5, since a new energy predefinition can nevertheless be output in the daily rhythm, even if it will only take effect over a day later. At most consideration might be given to adapting the correction dynamics, that is to say correspondingly setting the dimensioning of the first and second PI controllers 534 and 544, respectively, and also correspondingly setting the dynamics of the first and second first-order delay elements 538 and 548, respectively.

Merely for the sake of simplicity, no gain values or integration time constants are shown for the integrators of the two PI controllers 534 and 544, respectively, and also the integrators of the two first-order delay elements 538 and 548. However, they are not shown only for the sake of simplicity and should be provided, of course, and can serve for setting the dynamics.

One dimensioning possibility consists in the PI controllers each being dimensioned such that after 10 cycles in the case of an input step they attain this value at their output. Ten days could thus be provided as time constant.

It should be repeated, however, that the closed-loop control structure in FIG. 5 serves for illustration. The integrators in the predefinition block in FIG. 5, particularly of the PI controllers and the delay elements, can alternatively be embodied in discrete fashion. The time constant should then be chosen such that after 10 cycles in the case of an input step the end value is attained as far as the PI controller is concerned, and 63% of the input step is attained as far as each of the first-order delay elements is concerned. The proportionality factors K1 and K2, respectively, can have the value 0.5, for example. If both controllers are used simultaneously, as is illustrated in the figure, the gain factors can be halved and the time constants doubled during use.

Figure 6:
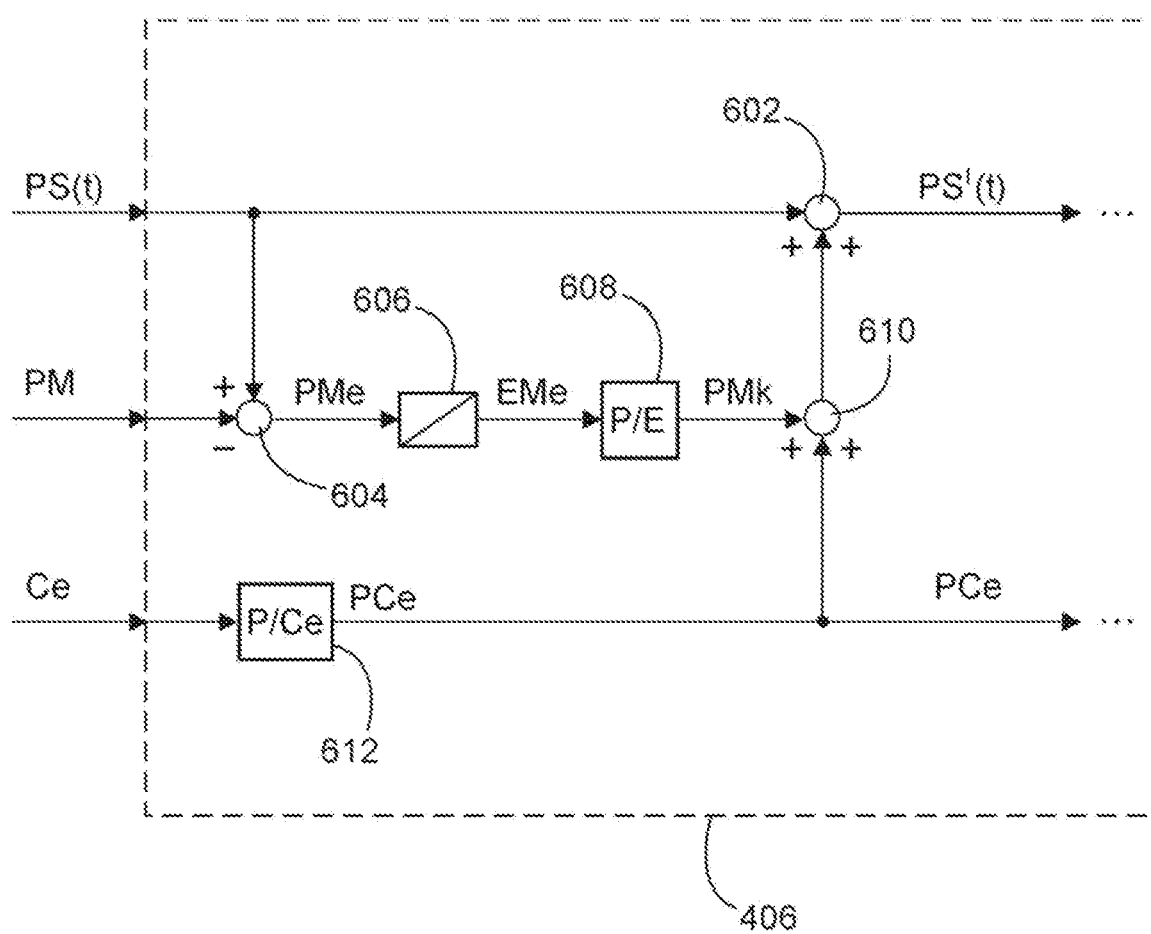
FIGS. 6 and 7 each show a part of a closed-loop control structure of a distribution block of the closed-loop control structure from FIG. 4.

FIG. 6 shows a first part of the distribution block 406 from FIG. 4. The distribution between the individual powers together with adaption possibilities is described in FIG. 7. The illustration in FIG. 6 thus considers only the part that acquires the exchange power profile PS(t), the detected summation power PM and the control deviation of the total state of charge Ce as input values.

Figure 7:
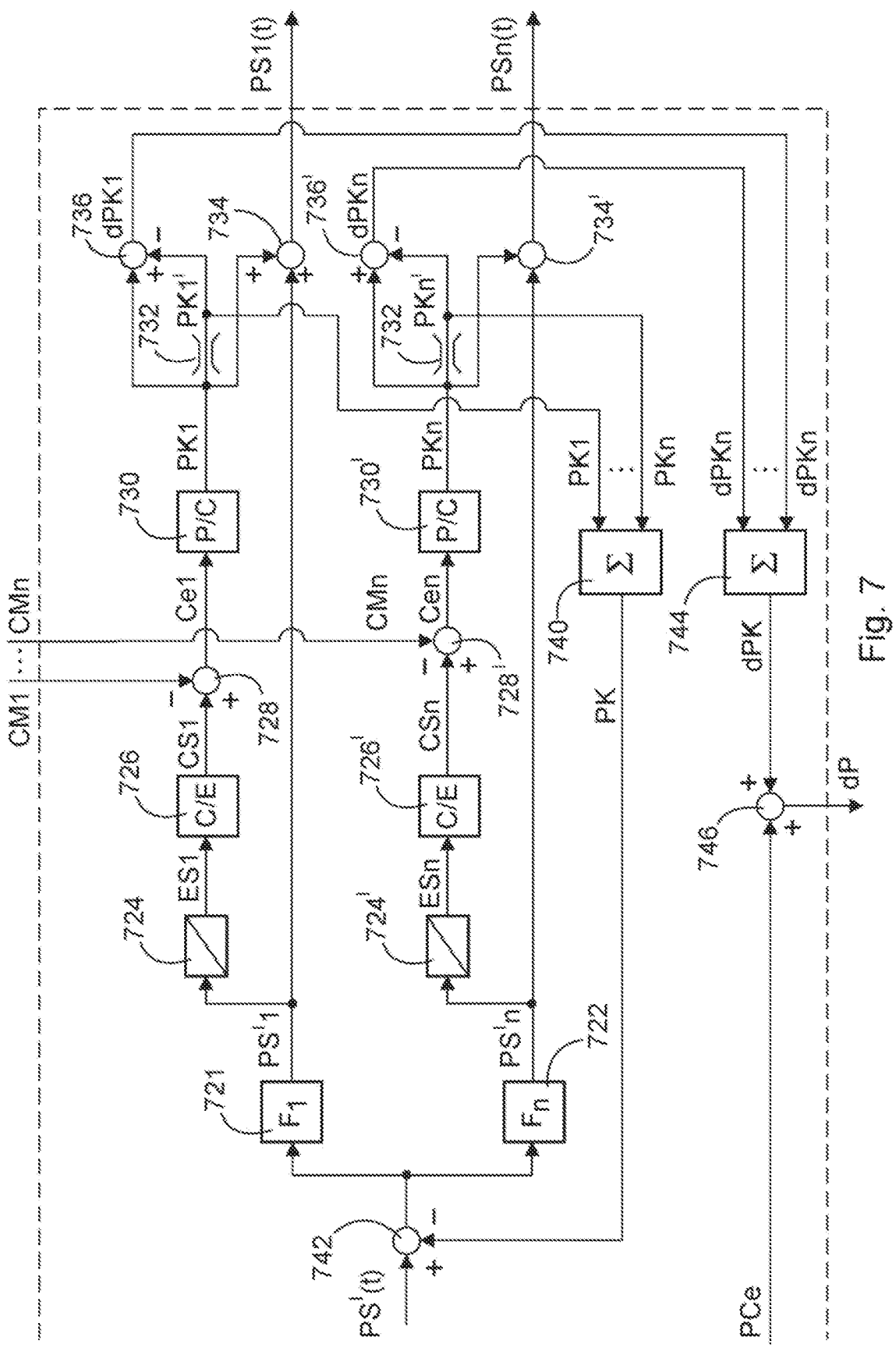

In principle, the exchange power is to be distributed in accordance with the exchange power profile PS(t) and is thus to be distributed between the individual partial exchange powers as is elucidated in FIG. 7. Depending on the detected summation power PM and also the control deviation of the total states of charge Ce, however, a correction can be provided and applied to the summing point 602. The modified exchange power profile PS'(t) then results. As correction, two variants are described in FIG. 6, which variants can also be employed jointly, as illustrated, but consideration is also given to taking account of or using only one variant.

When taking account of the summation power PM taken up, a difference with respect to the exchange power profile PS(t) taken up is formed at the summing point 604. The result is a control deviation relative to the power PMe. This control error is thus a power deviation and that is converted into a deviation energy, that is to say a control error of the energy EMe via the integrator 606. Said control error of the energy is converted into a correction value PMK via a dimensioning block 608 and, via the summing point 610, is then applied to the predefined exchange power profile PS(t) via the further summing point 602. A further correction can be added at the summing point 610.

Basically, a controller with an integral component is provided by the integrator 606 for the control deviation. The dimensioning block 608 can be regarded as gain or else as integration time constant. What is thus also achieved here is that a control error that reflects a power loss, for example, leads permanently to an applied correction value, even if the control error has already been corrected.

In addition, however, this type of procedure also has a technical importance, namely that the control deviation between predefined power and power that has occurred is converted into an energy only via the integrator 606. In this case, it should also be taken into account that energy is relevant in planning since procured energy is ultimately paid for. Here an energy deficit is thus determined and corrected. In this case, the dimensioning block 608 dimensions, of course, the input-side physical variable of energy into the output-side physical variable of power. Taking account of the control dynamics is also an additional factor, however, since the energy shortfall is corrected more rapidly or more slowly depending on the choice of the value in the dimensioning block 608.

A further correction possibility consists in using the control deviation of the total state of charge Ce. For this purpose, said control deviation is converted via the dimensioning block 612 into the power value PCe, which assigns a power deviation PCe to a state of charge deviation. This value can also be regarded as a correction value that can be applied to the exchange power profile via the summing point 610 and the summing point 602. Like the block 608, the dimensioning block 612 likewise converts the dimension of a state of charge into the dimension of a power.

Here, too, a dimensioning must additionally be provided which is used to set which power correction value is intended to correspond to which control deviation of the total state of charge. One dimensioning possibility consists in forming a quotient, between maximum power that can be input and maximum range of the states of charge. The maximum power that can be input is limited and was also already taken into account in the planning block 404. The maximum charge range is basically the value between maximum total state of charge and the minimum total state of charge. The values $C_{max}$ and $C_{min}$ input into the predefinition block, as elucidated by FIG. 5, could also be used here.

If the state of charge and thus also the control deviation of the total state of charge were taken into account as energy content, then the factors of the dimensioning block 608 and of the dimensioning block 612 could be identical and correspond to the abovementioned quotients between maximum power and maximum charge range. If the states of charge are given in percent and the control deviation of the total state of charge is thus also specified in percent, this would of course additionally have to be taken into account, i.e., worked out, in the dimensioning block 612.

With regard to the power deviation from the total state of charge Ce, it is additionally proposed, this also being elucidated even further in FIG. 7, to take account of said state of charge for the correction of a power request. For this purpose, this value can be input into the planning block 404, for example, as is indicated in a dashed manner in FIG. 4. For the correction value PMk, that is indeed also possible, in principle, but is not provided here for the following reason.

Taking account of the power deviation PMe means that the electric vehicles actually in total do not request the power provided in accordance with the exchange power profile. This deviation is intended to be corrected by the correction value PMk. Assuming that this correction is actually successful, that means that afterward, that is to say with the correction, the sum of the powers taken up by the electrical storage devices corresponds to the respective power value in accordance with the predefined exchange power profile. Therefore, or to put it better owing to that, no changed power request need be carried out.

In the case of the correction value based on the control deviation of the total state of charge PCe, however, the deviation does not lie in the power actually taken up, but rather in the result achieved. Ideally, precisely the power of the sum of the powers PM is exchanged between charging infrastructure and electrical supply network, but the desired target is not attained. By way of example, the total state of charge falls short of the predicted total state of charge. That means that actually too little exchange power was requested to attain the charging target striven for.

The values of the exchange power profile are thus too low at that moment, to stay with the example. They could, of course, also be too high. If this is corrected, that means that afterward, i.e., with this correction, the power that was originally provided in accordance with the exchange power profile is deliberately no longer requested or retrieved. Thus, more or less power than originally envisaged would be requested in this case. Therefore, provision is made for taking into account correspondingly further the power deviation in relation to the total state of charge PCe. Said power deviation could be transferred directly to the planning block 404, but it can also be taken into account together with a further power discrepancy, as is also elucidated in FIG. 7.

Moreover, the following should generally be pointed out as well. For the exchange power profile PS(t) and also for the energy predefinition E(t) but also the state of charge profile CS(t), and moreover also for some modifications in respect thereof, the time variable t indicates a time dependence. It should be emphasized here in particular that time profiles are predefined here. However, many other variables such as, for example, the total power profile PM or the control deviation of the total state of charge Ce and also various other variables in all of FIGS. 4-7 are usually likewise time-dependent. That is not indicated between parentheses there merely because the predefinition of an entire time profile is not involved.

FIG. 7 elucidates the division of the exchange power profile, which concerns the total power, between the individual partial exchange powers PS1(*t*)-PSn(t), including a variant for correcting deviations.

In this case, the central input variable is formed by the modified exchange power profile PS'(t), which can contain a correction value, as is elucidated in FIG. 6. To put it simply, FIG. 7 acquires the value from FIG. 6 as an input variable.

Firstly, said modified exchange power profile PS'(t) is divided by corresponding proportion factors F1-Fn. Proportion blocks 721-722 containing said factors are illustratively provided for taking into account. In the simplest case, when all of the connected electrical storage devices are dimensioned identically, all of the factors can be identical and have the value 1/n. However, the factors present can also be variable and for example take account of when an electric vehicle has not yet been connected.

In this regard, for example, with three identical electric vehicles, the factor can be ⅓ in each case. If, however, temporarily, one electric vehicle has not been connected, then its factor has the value 0, while the remaining factors have the value ½. It may be the case that the electric vehicle has only temporarily not been connected because it has returned to the charging infrastructure too late, i.e., only after the beginning of the start time period. In that case, the charging process can initially begin with the two electric vehicles and the factor 0.5 in each case and, as soon as the third electric vehicle is connected, all of the factors are then set to ⅓. However, the following explanation will not discuss this variant any further and basically assumes that the same electric vehicles are connected throughout.

The division thus results in provisional partial exchange powers PS'1-PS'n. The latter are intended to be used for charging the respective electric vehicle, i.e., the respective electrical storage device. The profile of the ideally resulting state of charge can be calculated therefrom, namely firstly by integration with the integrator 724, which results in a partial energy profile ES1.

A partial charge profile CS1 results via the dimensioning block 726. That is thus the calculated partial charge profile, which is compared with the detected partial charge profile CM1, namely at the summing point 728. The result is a partial charge deviation Ce1. The latter is converted into a power correction value Pk1 via a dimensioning block 730 and this value is applied to the provisional partial exchange power PS'1 at the summing point 734. This results in the no longer provisional partial exchange power PS1($t$). The latter forms an output of the distribution block 406 and can be passed to the terminal block as partial exchange power to be set.

Said power correction value Pk1 is additionally passed via the limiter 732 in order to check to what extent limitations are complied with. The result is then the limited partial power correction value Pk1'. If limits are not exceeded, the partial power correction value Pk1 is identical to the limited partial power correction value Pk1'. Otherwise, the partial power correction value Pk1 is greater than the limited partial power correction value Pk1' in terms of absolute value. The way in which this limitation is taken into account further will also be described below.

In any case, the procedure in the manner described is adopted for each partial exchange power through to the partial exchange power from PSn(t). To that end, a corresponding second strand is shown in FIG. 7 and the in this respect identical, at least corresponding blocks are identified by similar reference signs but with an apostrophe. However, different factors may be present particularly in the dimensioning blocks 726 and 730 in comparison with 726' and 730', particularly if the electric vehicles charged are not identical electric vehicles having identical electrical storage devices.

The limiter 732 or respectively 732' can then also be configured differently.

Applying the partial power correction Pk1 or respectively Pkn has the effect firstly that the respective partial exchange power is changed and thus the predefined total exchange power in accordance with the exchange power profile can also no longer be complied with. In order to avoid that, it is proposed to pass all limited partial power correction values Pk1'-Pkn' to a summing block 740 and add them up to form the power correction Pk. These power correction values, i.e., the sum of all limited partial power corrections, are then subtracted, as power correction value Pk, from the modified exchange power profile PS'(t) at the summing point 742.

This application to the summing point 742 firstly has the direct effect that the predefined modified exchange power profile PS'(t) is reduced again by the power applied by the correction. As a result of the correction, the power predefinition would no longer be able to be complied with, this being cancelled again as a result. However, it also appears to nullify the correction again.

The closed-loop control shown nevertheless manifests an effect, specifically particularly if partial power correction values of different magnitudes are ascertained and applied. This can be explained on the basis of the following simplified example.

If only two electric vehicles to be charged are present and a correction value, for example of 2 kW, results during the correction for the first partial exchange power PS1($t$), while no correction value is calculated for the other partial exchange power PS2($t$), then this results in the correction value Pk of 2 kW at the summing block 740. This is subtracted again at the summing point 742. Given identical division via the proportion blocks 721, 722, that results in a reduction of the power PS'1 and PSn' to be set by 1 kW in each case. The result is therefore that, in this first conceptual step, the power correction for the first electric vehicle for 2 kW was actually reduced, but was also partly applied to the second vehicle. Following this first step, therefore, the reduced correction power of 1 kW for the first electric vehicle would be adopted by the second electric vehicle. The first electric vehicle thus acquires 1 kW more, while the second electric vehicle acquires 1 kW less.

In accordance with the dynamic structure of the closed-loop control shown in FIG. 7, the adaptation would of course progress and, in the example mentioned, the values mentioned illustratively would change further.

A limitation should then also be taken into account. If the calculated provisional partial power correction value Pk'1 is within a limitation, firstly the sequence described above would take place. If a limit is reached, however, whether initially or only later during a further readjustment process, then a difference between the applied partial power correction value Pk1 and the limited partial power correction value Pk1' results.

This difference is taken into account at the summing point 736. The result then is a first correction deviation dPk1. This first correction deviation through to the n-th correction deviation, if such are present, can then be added up in the summing block 744 and yield the total correction deviation dPk.

This total correction deviation dPk is thus a power deviation by which the summation power PM deviates from the predefined exchange power, i.e., the total exchange power that was predefined as exchange power profile PS(t). This power would have to be requested as additional power just like the power deviation PCe from the total state of charge. For this purpose, the sum of these two values that results at the summing point 746 is output as power deviation.

This power deviation dP is also shown in FIG. 4 and, if possible, an attempt can be made to manage without an additional request of power by virtue of the controlled consumer or the controlled load 408 correspondingly adapting its power consumption or output.

The structure in FIG. 7 is a practical exemplary embodiment in which a first compensation can be effected, in which firstly a compensation between the electrical storage devices is carried out for small deviations. This type of closed-loop control structure manifests a very good effect particularly if, from a very large number of electrical storage devices, just a single one leads to a correction value, which can then be split uniformly between all the electrical storage devices, as a result of which the latter have to be adapted only minimally in terms of their power consumption. Particularly if provision is additionally made of a threshold value starting from which a correction value is actually calculated in the first case, such a redistribution could have the effect that the further electrical storage devices do not in turn take countermeasures with a correction value.

However, an effect would be manifested even in the case of an identical deviation of all the electrical storage devices, specifically because the negative application of the power correction value for the summation power PK in the case of all partial exchange powers would lead to an increasing error correction until the limitation is respectively reached. The correction deviations and also the total correction deviation dPk then increase and would lead either to a changed power predefinition or to a transfer to a controllable consumer or the controlled load 408.

To supplement the structure shown in FIG. 7, there is also consideration for example of the fact that in the case of permanently recognized deviations, i.e., for example depending on the respective partial power correction value Pk1-Pkn, the proportion blocks 721-722 or the proportion factors F1-Fn can be adapted.

The adoption of correction power between the respective partial exchange powers can also be effected in addition or as an alternative to the closed-loop control structure shown in FIG. 7 for example by means of corresponding evaluation logics. In addition to or instead of the closed-loop control structure shown, corrective control and correction can also be carried out by means of an evaluation logic.

It has been recognized in particular that diverse limitations of the exchange power and particularly of the partial powers of the power units may be present.

For individual storage devices or individual charging terminals, which may also be referred to as charging points, the exchange power is determined by the presently possible power of the charging point in the charging direction and the discharging direction, namely by the presently possible exchange power of the battery and by the point in the charging curve. Often, however, the powers are discrete values or a unique value without a possibility for variation, or bands or possibilities for variation arise. Some examples:

If the target state of charge (target SoC) can only be attained if charging is effected with maximum power, the possible exchange power is precisely the value of the maximum charging power.

If the storage device, which may also be referred to as a rechargeable battery, is, e.g., half charged and the charging time period is still long (e.g., three times the time required to charge the rechargeable battery to 100% at full charging power), then the possible exchange power corresponds to the band of the maximum charging power and the maximum feedback power. However, such a band or such a variation range may have different limits for charging and discharging and be, e.g., between +350 kW and −50 kW if the bidirectionality has an asymmetrical power.

If the state of charge, which may also be referred to as SoC, of the rechargeable battery approaches 90%, the maximum charging power decreases continuously.

If the rechargeable battery is very cold or hot, the possible power exchange is also restricted.

Within an assembly, i.e., upon joint consideration of a plurality of storage devices, in particular upon consideration of all connected storage devices of the charging infrastructure, that is even more complicated, which has been recognized. A common SoC, i.e., in particular the total state of charge of the assembly, can indeed contain very different possible exchange powers. Examples:

50% total SoC, in particular total state of charge, can mean the following variants:

Maximum charging power and discharge power if all rechargeable batteries are at 50%.

Half charging power and half discharge power if half of the individual states of charge are at 100% and the other half are at 0%.

70% charging power and also 70% discharge power if half are at 90% and the other half at 10%, if a symmetrical division is present. In the example for an asymmetrical division, however, consideration is also given to there being 70% charging power and 100% discharge power.

In the assembly, the currently connected units also play a part, of course, i.e., the taking account of the fact that power units are connected, as result of which the available power range is changed. The power range then increases or decreases further and further when power units are connected or disconnected, respectively.

The capacity utilization of the charging infrastructure also plays a part. Precisely if charging power can be distributed variably between charging points, the capacity utilization of the charging infrastructure may play a part.

Even if "charging transfer" is effected precisely within a charging infrastructure, that is to say that power is transferred from one rechargeable battery into another, the total power possible toward the outside decreases.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling electrical power exchanged between a charging infrastructure and an electrical supply network, wherein:

a plurality of electric vehicles are connectable to the charging infrastructure for exchanging the electrical power by outputting the electrical power to or drawing the electrical power from the electrical supply network via the charging infrastructure, wherein outputting the electrical power to the electrical supply network discharges at least one electric vehicle of the plurality of electric vehicles and drawing the electrical power from the electrical supply network charges the at least one electric vehicle of the plurality of electric vehicles, and the method comprises:

determining an energy setting for a control time period, wherein the energy setting predefines at least a quantity of energy that the charging infrastructure is to draw from the electrical supply network in the control time period;

setting a power limitation that specifies at least one limit for the exchange of the electrical power to be provided by the charging infrastructure;

setting an exchange power profile depending on the energy setting and the power limitation, wherein the exchange power profile sets, for the charging infrastructure, a temporal profile of the electrical power for the control time period;

determining a plurality of partial exchange powers for the plurality of electric vehicles, respectively, wherein:

a sum of the plurality of partial exchange powers corresponds to the electrical power, the plurality of partial exchange powers are determined depending on a plurality of states of charge, respectively, the plurality of states of charge pertaining to the plurality of electric vehicles, respectively, and the plurality of partial exchange powers are determined based on a plurality of partial power limits, respectively, the plurality of partial power limits pertaining to the plurality of electric vehicles, respectively; and causing the plurality of electric vehicles to exchange the plurality of partial exchange powers, respectively, to thereby exchange the electrical power between the charging infrastructure and the electrical supply network.

2. The method as claimed in claim 1, wherein:
the plurality of partial power limits are variable and are determined depending on the plurality of states of charge, respectively, and/or
the plurality of partial exchange powers are set as a plurality of partial power profiles, respectively, depending on the exchange power profile.

3. The method as claimed in claim 2, wherein:
a total state of charge is determined from the plurality of states of charge of the plurality of electric vehicles connected to the charging infrastructure,
for the total state of charge, a temporal profile of a state of charge range is set as a flexibility range, wherein the flexibility range is spanned by a temporal profile of an upper limit of the total state of charge and a temporal profile of a lower limit of the total state of charge for the control time period, and
at least one of:
determining the energy setting or setting the exchange power profile is performed depending on the flexibility range, and/or
the control time period ends at a target time instant and the upper limit of the total state of charge at the target time instant is greater than the lower limit of the total state of charge at the target time instant.

4. The method as claimed in claim 1, wherein:
determining a partial exchange power of the plurality of partial exchange powers is performed depending on a deviation of a state of charge of a respective electric vehicle from a relative average state of charge, and
determining the partial exchange power is performed such that the relative state of charge is matched to the average state of charge.

5. The method as claimed in claim 1, wherein:
a positive partial exchange power with which an electric vehicle of the plurality of electric vehicles is charged is determined depending on a difference between a state of charge of the electric vehicle and a state of charge to be reached, and
a negative partial exchange power with which the electric vehicle of the plurality of electric vehicles is discharged is determined depending on a difference between the state of charge of the electric vehicle and a discharged state of charge.

6. The method as claimed in claim 1, comprising:
predefining a positive exchange power according to which the electrical power is drawn from the electrical supply network for charging the plurality of electric vehicles or predefining a negative exchange power according to which the electrical power is fed into the electrical supply network;
in response to predefining the positive exchange power, causing a first set of electric vehicles having respective states of charge below a relative average state of charge to be charged with priority and/or with greater power than a second set of electric vehicles having respective states of charge above the relative average state of charge; and
in response to predefining the negative exchange power, causing a third set of electric vehicles having respective states of charge above the relative average state of charge to be discharged with priority and/or with greater power than a fourth set of electric vehicles having respective states of charge below the relative average state of charge.

7. The method as claimed in claim 6, wherein:
depending on the exchange power profile, stored energy is transferred from first electric vehicles of the plurality of electric vehicles having a state of charge above the relative average state of charge into second electric vehicles of the plurality of electric vehicles having a state of charge below the relative average state of charge.

8. The method as claimed in claim 1, comprising:
determining a network power demand of the electrical supply network for the control time period; and
determining the exchange power profile depending on the network power demand, wherein the network power demand is a temporal profile.

9. The method as claimed in claim 1, wherein:
the charging infrastructure is connected to the electrical supply network at at least one network connection point,
the electrical power is exchanged between the charging infrastructure and the electrical supply network via the at least one network connection point, and
the exchange power profile and/or a partial exchange power of the plurality of partial power profiles are determined depending on at least one property of the at least one network connection point.

10. The method as claimed in claim 1, comprising:
in response to causing the plurality of electric vehicles to exchange the plurality of partial exchange powers, respectively, monitoring, by a central controller, a total state of charge and comparing the total state of charge with a predefined state of charge profile; and
in response to comparing the total state of charge with the predefined state of charge profile, transmitting information and/or control commands from the central controller to the plurality of electric vehicles to readjust the plurality of partial exchange powers exchanged by the plurality of electric vehicles.

11. The method as claimed in claim 10, comprising:
monitoring the plurality of states of charge;
comparing the plurality of states of charge with a plurality of predefined states of charge, respectively, to detect a plurality of partial deviations of the plurality of electric vehicles, respectively; and
adjusting the plurality of partial exchange powers depending on the plurality of partial deviations, and/or determining future partial power profiles is depending on the plurality of partial deviations.

12. The method as claimed in claim 11, a distribution specification for determining the plurality of partial power profiles depending on the exchange power profile is adapted depending on the plurality of partial deviations.

13. The method as claimed in claim 1, comprising:
determining a total state of charge and/or a charging energy demand of the charging infrastructure in response to at least one of the plurality of electric vehicles being connected to or disconnected from the charging infrastructure.

14. The method as claimed in claim 1, comprising:
in response to exchanging the electrical power,
detecting the electrical power;
comparing the electrical power with a sum of the plurality of partial exchange powers; and determining a difference between the electrical power and the sum of the plurality of partial exchange powers; and depending on the difference, adjusting the plurality of partial exchange powers to reduce the difference, wherein the difference represents a deviation energy determined over a checking time period, wherein the checking time period is chosen as a time period from a beginning of the control time period to a present instant.

15. The method as claimed in claim 3, comprising:

determining a predefined temporal profile of the total state of charge as a state of charge profile from the exchange power profile, detecting a deviation of a detected total state of charge profile from the state of charge profile as a detected deviation energy; and adjusting the plurality of partial exchange powers or the plurality of partial power profiles depending on the detected deviation energy.

16. The method as claimed in claim 15, comprising:

adjusting the plurality partial exchange powers or the plurality of partial power profiles in response to an absolute value of the detected deviation energy reaching a predefinable minimum deviation.

17. The method as claimed in claim 1, comprising:

for each of a first electric vehicle and at least one second electric vehicle of the plurality of electric vehicles,
setting a partial state of charge profile determined from a partial power profile of the electric vehicle; and
determining a partial deviation between a detected partial state of charge and a partial state of charge predefined by the partial state of charge profile;

changing a partial exchange power and/or the partial power profile of the first electric vehicle depending on the partial deviation of the first electric vehicle to reduce an absolute value of the partial deviation of the first electric vehicle, wherein changing the partial exchange power and/or the partial power profile results in a change in the exchange power profile and/or in a total state of charge; and changing a partial exchange power and/or the partial power profile of the at least one second electric vehicle based on the partial deviation of the at least one second electric vehicle to counteract the change in the exchange power profile and/or the total state of charge caused by the first electric vehicle.

18. The method as claimed in claim 17, wherein:

changing the partial exchange power and/or the partial power profile of the first electric vehicle and changing the partial exchange power and/or the partial power profile of the at least one second electric vehicle is performed such that the absolute value of the partial deviation of the first electric vehicle and an absolute value of the partial deviation of the at least one second electric vehicle do not exceed a predefinable maximum deviation, and if an absolute value of at least one partial deviation exceeds the predefinable maximum deviation, the exchange power profile and/or a predefined state of charge profile is changed.

19. The method as claimed in claim 1, wherein depending on the exchange power profile, a target state of charge is determined as a total state of charge expected at an end of the control time period, upon or after reaching the end of the control time period, an end state of charge is detected as an actual total state of charge at the end of the control time period, and depending on comparing the end state of charge with the target state of charge, a charging energy demand is determined for a further control time period.

20. The method as claimed in claim 19, wherein:

the charging energy demand is determined using a calculation specification, and the calculation specification or the charging energy demand is changed depending on comparing the end state of charge with the target state of charge.

21. The method as claimed in claim 1, comprising:

determining a difference between power actually exchanged and the electrical power predefined by the exchange power profile;

determining a charging energy demand by calculation specification; and depending on the difference, determining a further charging energy demand for a further control time period, wherein the calculation specification or the charging energy demand is changed depending on the difference.

22. The A-charging infrastructure, comprising:

a central controller configured to perform the method as claimed in claim 1.

23. A charging station, comprising:

the charging infrastructure as claimed in claim 22.

24. A method for controlling electrical power exchanged between a charging infrastructure and an electrical supply network, wherein a plurality of power units are connectable to the charging infrastructure for exchanging the electrical power by outputting the electrical power to or drawing the electrical power from the electrical supply network via the charging infrastructure, wherein outputting the electrical power to the electrical supply network discharges at least one power unit of the plurality of power units and drawing the electrical power from the electrical supply network charges the at least one power unit of the plurality of power units, and the method comprises:
determining an energy setting for a control time period, wherein the energy setting predefines at least a quantity of energy that the charging infrastructure is to draw from the electrical supply network in the control time period;

setting a power limitation that specifies at least one limit for the exchange of the electrical power to be provided by the charging infrastructure;

setting an exchange power profile depending on the energy setting and the power limitation, wherein the exchange power profile sets, for the charging infrastructure, a temporal profile of the electrical power for the control time period;

determining a plurality of partial exchange powers for the plurality of power units, respectively, wherein:
a sum of the plurality of partial exchange powers corresponds to the electrical power,
the plurality of partial exchange powers are determined depending on a plurality of states of charge, respectively, the plurality of states of charge pertaining to the plurality of power units, respectively, and
the plurality of partial exchange powers are determined based on a plurality of partial power limits, respectively, the plurality of partial power limits pertaining to the plurality of power units, respectively; and causing the plurality of power units to exchange the plurality of partial exchange powers, respectively, to thereby exchange the electrical power between the charging infrastructure and the electrical supply network, wherein:

at least one of the plurality of power units is a controllable electrical consumer without an electrical storage device, and the controllable consumer and/or at least one controllable generator of the charging infrastructure is controlled such that changing the plurality of partial power profiles is compensated for such that the electrical power complies with the exchange power profile.

* * * * *